(12) United States Patent
White et al.

(10) Patent No.: US 10,246,554 B2
(45) Date of Patent: Apr. 2, 2019

(54) AEROGEL INSULATION PANELS AND MANUFACTURING THEREOF

(71) Applicant: ASPEN AEROGELS, INC., Northborough, MA (US)

(72) Inventors: Shannon Olga White, Hudson, MA (US); Nicholas Anthony Zafiropoulos, Newton, MA (US); Jimmy Lee Clark, Newhall, CA (US)

(73) Assignee: Aspen Aerogels, Inc., Northborough, MA (US)

( * ) Notice: Subject to any disclaimer, the term of this patent is extended or adjusted under 35 U.S.C. 154(b) by 0 days.

(21) Appl. No.: 15/419,633

(22) Filed: Jan. 30, 2017

(65) Prior Publication Data

US 2017/0326849 A1 Nov. 16, 2017

Related U.S. Application Data

(62) Division of application No. 14/202,873, filed on Mar. 10, 2014, now Pat. No. 9,593,206.

(Continued)

(51) Int. Cl.
| | |
|---|---|
| *B32B 27/28* | (2006.01) |
| *C08G 73/10* | (2006.01) |
| *B32B 5/18* | (2006.01) |
| *C08L 79/08* | (2006.01) |
| *C08K 7/06* | (2006.01) |
| *B32B 5/32* | (2006.01) |
| *B32B 3/04* | (2006.01) |
| *B32B 3/26* | (2006.01) |
| *B32B 5/10* | (2006.01) |

(Continued)

(52) U.S. Cl.
CPC ............... *C08G 73/10* (2013.01); *B32B 3/04* (2013.01); *B32B 3/266* (2013.01); *B32B 5/10* (2013.01); *B32B 5/18* (2013.01); *B32B 5/32* (2013.01); *B32B 27/281* (2013.01); *C08G 73/1067* (2013.01); *C08K 3/04* (2013.01); *C08K 7/06* (2013.01); *C08L 79/08* (2013.01); *F16L 59/028* (2013.01); *B32B 2266/0214* (2013.01); *B32B 2266/0292* (2013.01); *B32B 2266/04* (2013.01); *B32B 2266/057* (2016.11); *B32B 2266/06* (2013.01); *B32B 2266/102* (2016.11); *B32B 2266/126* (2016.11); *B32B 2307/302* (2013.01); *B32B 2307/304* (2013.01); *B32B 2307/416* (2013.01); *B32B 2307/546* (2013.01); *B32B 2307/72* (2013.01); *B32B 2605/18* (2013.01); *C08G 2101/0091* (2013.01); *C08G 2330/00* (2013.01); *Y10T 428/233* (2015.01); *Y10T 428/249953* (2015.04); *Y10T 428/249986* (2015.04)

(58) Field of Classification Search
CPC ....................................................... B32B 5/18
USPC ........................................................... 428/71
See application file for complete search history.

(56) References Cited

U.S. PATENT DOCUMENTS

| | | |
|---|---|---|
| 2,188,007 A | 1/1940 | Kistler |
| 4,363,738 A | 12/1982 | Kummermehr |

(Continued)

*Primary Examiner* — Brent T O'Hern
(74) *Attorney, Agent, or Firm* — Nilay J. Chokei; Poongunran Muthukumaran

(57) ABSTRACT

The present invention provides articles and methods related to insulation panels made from aerogels, and specifically polyimide based aerogels. Such insulation panels have a wide variety of applications, including specifically in aerospace applications.

18 Claims, 18 Drawing Sheets

Related U.S. Application Data

(60) Provisional application No. 61/774,660, filed on Mar. 8, 2013.

(51) Int. Cl.
*C08K 3/04* (2006.01)
*F16L 59/02* (2006.01)
*C08G 101/00* (2006.01)

(56) References Cited

U.S. PATENT DOCUMENTS

| | | |
|---|---|---|
| 4,447,345 A | 5/1984 | Kummermehr et al. |
| 4,619,908 A | 10/1986 | Cheng et al. |
| 4,667,417 A | 5/1987 | Graser et al. |
| 4,717,708 A | 1/1988 | Cheng et al. |
| 5,275,796 A | 1/1994 | Tillotson et al. |
| 5,306,555 A | 4/1994 | Ramamurthi et al. |
| 5,502,156 A | 3/1996 | St. Clair et al. |
| 5,520,960 A | 5/1996 | Rancourt et al. |
| 5,565,142 A | 10/1996 | Deshpande et al. |
| 5,631,097 A | 5/1997 | Andersen et al. |
| 5,683,772 A | 11/1997 | Andersen et al. |
| 5,786,059 A | 7/1998 | Frank et al. |
| 5,789,075 A | 8/1998 | Frank et al. |
| 5,830,387 A | 11/1998 | Yokogawa et al. |
| 5,866,027 A | 2/1999 | Frank et al. |
| 5,962,539 A | 10/1999 | Perrut et al. |
| 5,972,254 A | 10/1999 | Sander |
| 5,973,015 A | 10/1999 | Coronado et al. |
| 6,068,882 A | 5/2000 | Ryu |
| 6,080,475 A | 6/2000 | Frank et al. |
| 6,083,619 A | 7/2000 | Frank et al. |
| 6,087,407 A | 7/2000 | Coronado et al. |
| 6,140,377 A | 10/2000 | Schwertfeger et al. |
| 6,187,250 B1 | 2/2001 | Champagne |
| 6,197,270 B1 | 3/2001 | Sonada et al. |
| 6,399,669 B1 | 6/2002 | Suzuki et al. |
| 6,479,416 B1 | 11/2002 | Frank et al. |
| 6,620,355 B1 | 9/2003 | Schmidt |
| 6,656,527 B1 | 12/2003 | Gessner et al. |
| 6,670,402 B1 | 12/2003 | Lee et al. |
| 6,887,563 B2 | 5/2005 | Frank et al. |
| 6,989,123 B2 | 1/2006 | Lee et al. |
| 7,071,287 B2 | 7/2006 | Rhine et al. |
| 7,074,880 B2 | 7/2006 | Rhine et al. |
| 7,078,359 B2 | 7/2006 | Stepanian et al. |
| 7,399,439 B2 | 7/2008 | Lee et al. |
| 7,504,346 B2 | 3/2009 | Stepanian et al. |
| 7,780,890 B2 | 8/2010 | Lee et al. |
| 7,781,492 B2 | 8/2010 | Williams et al. |
| 7,977,411 B2 | 7/2011 | William et al. |
| 8,214,980 B2 | 7/2012 | Bullock et al. |
| 8,453,393 B2 | 6/2013 | Schroth et al. |
| 9,077,041 B2 | 7/2015 | Burnside et al. |
| 2005/0192366 A1 | 9/2005 | Ou et al. |
| 2006/0240216 A1* | 10/2006 | Stepanian ............ F16L 59/065 428/76 |
| 2006/0263587 A1 | 11/2006 | Ou et al. |
| 2006/0286360 A1 | 12/2006 | Rhine et al. |
| 2007/0152363 A1 | 7/2007 | Begag et al. |
| 2008/0057334 A1 | 3/2008 | Scroth et al. |
| 2010/0080949 A1 | 4/2010 | Ou et al. |
| 2012/0097907 A1 | 4/2012 | Bauer et al. |
| 2012/0128958 A1 | 5/2012 | Zeng et al. |

* cited by examiner

|  | Target Density (g/cc) | Final Density (g/cc) | Comp. Strength (psi) | Comp. Mod (psi) |
|---|---|---|---|---|
| PI-4g | 0.04 | 0.0787 | 57.3 | 816.7 |
| PI-5g | 0.05 | 0.0798 | 57.9 | 931.3 |
| PI-6g | 0.06 | 0.1229 | 163.4 | 4634.7 |
| PI-8g | 0.08 | 0.1731 | 326.8 | 8775.9 |
| PI-4a | 0.04 | 0.1243 | 184.8 | 2632.3 |
| PI-6a | 0.06 | 0.2038 | 559.9 | 9318.9 |
| PI-8a | 0.08 | 0.2969 | 1107.0 | 15307.0 |

Figure 7 (continued)

| Non-Reinforced | | | | Carbon Felt | | | |
|---|---|---|---|---|---|---|---|
| | Target Density (g/cc) | Final Density (g/cc) | TC (mW/mK) | | Target Density (g/cc) | Final Density (g/cc) | TC (mW/mK) |
| PI-4g | 0.04 | 0.0787 | 26.03 | CF-4g | 0.04 | 0.1159 | 18.50 |
| PI-6g | 0.06 | 0.1229 | 31.65 | CF-6g | 0.06 | 0.1386 | 21.70 |
| PI-8g | 0.08 | 0.1731 | 39.48 | CF-8g | 0.08 | 0.1728 | 23.60 |
| PI-4a | 0.04 | 0.1243 | 38.3 | CF-4a | 0.04 | 0.1463 | 31.90 |
| PI-6a | 0.06 | 0.2038 | 46.5 | CF-6a | 0.06 | 0.1933 | 27.30 |
| PI-8a | 0.08 | 0.2969 | 59.4 | CF-8a | 0.08 | 0.2079 | 31.60 |

| Quartzel® | | | | Carbon Tissue | | | |
|---|---|---|---|---|---|---|---|
| | Target Density (g/cc) | Final Density (g/cc) | TC (mW/mK) | | Target Density (g/cc) | Final Density (g/cc) | TC (mW/mK) |
| Q-4g | 0.04 | 0.0641 | 19.00 | CT-4g | 0.04 | 0.0936 | 18.60 |
| Q-6g | 0.06 | 0.0979 | 22.10 | CT-6g | 0.06 | 0.1222 | 21.90 |
| Q-8g | 0.08 | 0.1302 | 24.60 | CT-8g | 0.08 | 0.1375 | 25.40 |
| Q-4a | 0.04 | 0.0717 | 28.30 | CT-4a | 0.04 | 0.1169 | 23.90 |
| Q-6a | 0.06 | 0.1185 | 30.50 | CT-6a | 0.06 | 0.1660 | 23.20 |
| Q-8a | 0.08 | 0.1623 | 33.90 | CT-8a | 0.08 | 0.2166 | 23.90 |

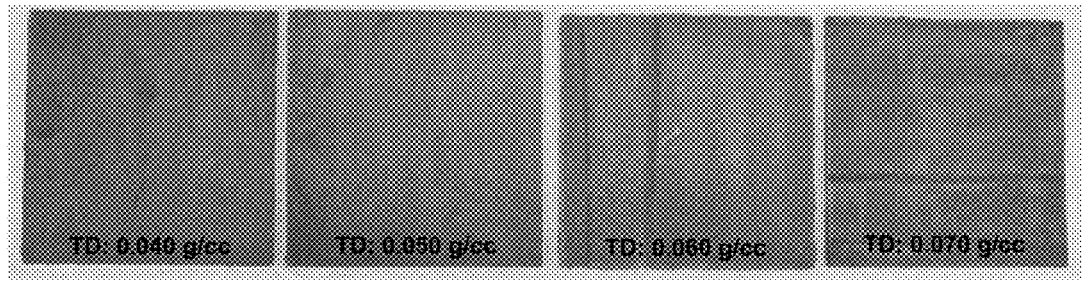
Figure 13
| | Thickness (mm) | Final Density (g/cc) | TC (mW/m-K) |
|---|---|---|---|
| TD = 0.040 g/cc | 5.060 | 0.1196 | 19.1 |
| TD = 0.050 g/cc | 4.890 | 0.1396 | 20.8 |
| TD = 0.060 g/cc | 4.755 | 0.1554 | 21.4 |
| TD = 0.070 g/cc | 4.619 | 0.1731 | 21.9 |
* TC obtained at ambient pressure and temperature
Figure 14
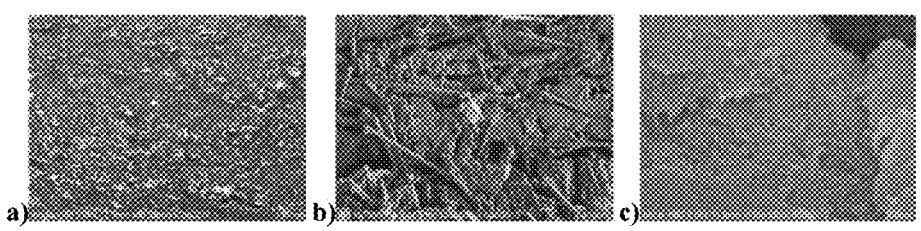
Figure 15

| | Target Density (g/cc) | Final Density (g/cc) | Compressive Strength (psi) | Compressive Young's Modulus (psi) |
|---|---|---|---|---|
| Pt-4g | 0.04 | 0.0787 | 57.3 | 816.7 |
| CF-4g | 0.04 | 0.1159 | 11.9 | 91.4 |
| CF-4a | 0.04 | 0.1403 | 19.3 | 147.2 |
| Q-4g | 0.04 | 0.0541 | 10.7 | 98.0 |
| Q-4a | 0.04 | 0.0717 | 25.9 | 306.0 |
| CT-4g | 0.04 | 0.0836 | 11.5 | 182.4 |
| CT-4a | 0.04 | 0.1169 | 18.6 | 215.0 |

AEROGEL INSULATION PANELS AND MANUFACTURING THEREOF

REFERENCE TO RELATED APPLICATIONS

This application is a Divisional Application from U.S. patent application Ser. No. 14/202,873, filed on Mar. 10, 2014, now U.S. Pat. No. 9,593,206; which claims priority from U.S. Provisional Application 61/774,660, filed on Mar. 8, 2013; both of which are incorporated by reference in their entirety as if fully set forth, insofar as the incorporated subject matter does not conflict with the subject matter of the current application.

STATEMENT REGARDING FEDERALLY SPONSORED RESEARCH OR DEVELOPMENT

This invention was made with Government support under Contract W31P4Q-10-C-0209 awarded by DARPA. The Government has certain rights in this invention.

FIELD OF INVENTION

The invention relates to laminate panels which can be used in aerospace applications. The panels include a polyimide-based aerogel layer, at least one facesheet layer, and a reflective protection layer on the facesheet.

BACKGROUND

This invention is directed to laminate panels which include a polyimide-based aerogel layer, at least one facesheet layer, and a reflective protection layer on the facesheet. The aerogel layer functions both to insulate and structurally support the panel.

Aerospace panels are difficult to design and produce. The nature of aerospace travel presents environmental stress on panel materials which are far beyond the stress faced in typical applications of those materials. Materials used in the design of aerospace paneling must therefore be durable enough to withstand the extreme conditions in those stressful environments. The nature of aerospace travel also requires that paneling materials be as light as possible. Small differences in the density and weight of these materials can have significant effects on the functionality of the panel, as well as the functionality and energy efficiency of the aerospace device as a whole. Thus, structural and insulating materials in aerospace panels must be selected and optimized for the specific challenges found in aerospace travel.

Aerogel composites have physical and chemical properties which can potentially be optimized to withstand the demands of aerospace panel design. Aerogels describe a class of materials based upon their structure; namely low density, open cell structures with large surface areas (often 900 m2/g or higher) and sub-nanometer scale pore sizes. Aerogels can be prepared by replacing the liquid solvent in a wet gel with air, without substantially altering or collapsing the network structure (e.g., pore characteristics) or the volume of the gel body. Supercritical and subcritical fluid extraction technologies are used to extract the fluid from the gel without causing the collapse of the pores. A variety of different inorganic and organic aerogel compositions are known. Inorganic aerogels are generally based upon metal alkoxides and include materials such as silica, carbides, and alumina. Organic aerogels include carbon aerogels and polymeric aerogels such as polyimides.

Aerogels function as thermal insulators primarily by minimizing conduction (low density, tortuous path for heat transfer through the nanostructures), convection (very small pore sizes minimize convection), and radiation (IR suppressing dopants may easily be dispersed throughout the aerogel matrix). Depending on the formulation, aerogels can function at temperatures of 550° C. and above. Low to moderate density aerogel materials (typically in the range of about 0.01 g/cm to about 0.3 g/cm) are widely considered to be the best solid thermal insulators, and have thermal conductivities of about 12 mW/m-K and below at 37.8° C. and atmospheric pressure.

Aerogels can also be fiber reinforced during production to provide significant structural stability and resilience, particularly in high flexural strain applications. The flexibility of thin aerogel sheets (typically between about 0.1 mm and about 25 mm) allows for the manufacture of large sections of aerogel composites which retain most of the useful qualities of aerogels, such as low density and low thermal conductivity.

A need thus exists for structural and insulating materials which have the strength, thermal conductivity, and density properties to allow for optimized design and manufacturing of aerospace panels. Specifically, a need exists for optimized aerogel materials which have strength, thermal conductivity, and density properties that allow for effective design and manufacturing of aerospace panels. A need also exists for laminate aerospace panels which effectively incorporate the optimized aerogel materials.

SUMMARY OF THE INVENTION

The present invention describes a laminate panel comprising: (a) a polyimide based aerogel layer having two major faces; (b) a facesheet on at least one major face of the aerogel layer; and (c) a reflective layer adjacent to the facesheet. The panel may include a facesheet on both major faces of the aerogel layer. The panel may additionally include edge seals to seal the edges of the panel. The panel may comprise at least one hole in or through the panel to facilitate fastening.

The panel includes a polyimide based aerogel layer. The polyimide based aerogels used in the present invention may be carbonized. Carbonization may be carried out by pyrolysis at elevated temperatures in an inert atmosphere. The carbonized forms of the aerogels used in the present invention may have the nitrogen content between 0 and 20%. The aerogels used in the present invention may also comprise silica components. Such silica components may be in physical mixtures with polyimides or covalently linked to silica. The aerogel layer may also be reinforced with fibers. The aerogel may comprise an opacifier such titanium dioxide, silicon carbide, carbon black, graphite phosphates, borates, metal silicates, metallocenes, molybdates, stannates, hydroxides, carbonates, zinc oxides, aluminum oxides, antimony oxides, magnesium-zinc blends, magnesium-zinc-antimony blends, or a combination thereof.

The aerogel layer may comprise a polyimide based aerogel which has specific physical and chemical properties. Specifically, the arogel layer of the present invention can have a specific combination of flexural strength, flexural modulus, density, and thermal conductivity. The aerogel material can have a flexural strength, without failure, of at least 150 psi, at least 200 psi, or at least 250 psi. The aerogel material can have a flexural modulus, without failure, of at least 5,000 psi, at least 20,000 psi, or at least 40,000 psi. The aerogel material can have a density below 0.25 g/cc, below 0.15 g/cc, or below 0.10 g/cc. The aerogel material can have a thermal conductivity at ambient temperature and ambient pressure below 40 mW/m-K, below 30 mW/m-K, or below 20 mW/m-K. The aerogel material can have a thermal conductivity at ambient temperature in a vacuum of $10^{-5}$ torr below 10 mW/m-K, below 5 mW/m-K, or below 3 mW/m-K.

The panel includes a facesheet on at least one major face of the aerogel layer. In one embodiment, the panel includes a facesheet on both major faces of the aerogel layer. In another embodiment, the face sheet comprises a graphite cyanate ester face sheet.

The panel includes a reflective layer adjacent to the facesheet. The reflective layer reflects at least one frequency of incident energy. In one embodiment, the reflective layer covers the entirety of the facesheet. In another embodiment, the reflective layer protects the panel from damage by reflecting at least one frequency of incident energy which can potentially damage the panel. The reflective layer can comprise a silver Teflon coating material.

The panel may include at least one vent that allows air to flow in and out of the panel. The panel may include at least one filter that filters particulate matter. In one embodiment, the panel includes a vent that allows air to flow in and out of the panel, and a particulate filter over the vent that keeps particulate matter within the panel. In another embodiment, the panel includes edge seals which include at least one vent and at least one particulate filter. In a further embodiment, the panel includes edge seals which include at least one vent and at least one particulate filter, wherein the vents in the edge seals allow air to flow in and out of the panel edges, and wherein the filters capture and retain particulate matter in the flowing air to prevent contamination of the air outside the panel with particulate matter.

The present invention also provides methods of manufacturing a laminate panel comprising the steps of: (a) providing a polyimide aerogel layer with two major faces; (b) attaching a facesheet to at least one major face of the aerogel layer; and (c) attaching a reflective layer to the facesheet. The panels of the present invention may be sealed at the edges. At least a hole through the panel may be provided for various reasons, including accommodation for structural members. Such holes may not have to be through the entire thickness of the panel and may simply allow for fasteners or screws to be used for attachment of the panel against other components.

In one embodiment, the present invention comprises an aerogel insulation layer having: (a) density of 0.20 g/cc or less, 0.15 g/cc or less, or 0.10 g/cc or less; (b) a thermal conductivity at ambient temperature and ambient pressure of 30 mW/m-K or less, 25 mW/m-K or less, 20 mW/m-K or less, or 15 mW/m-K or less; (c) a flexural strength of 150 psi or more, 200 psi or more, or 250 psi or more; and (d) a flexural modulus of 5000 psi or more, 20000 psi or more, or 40000 psi or more. The aerogel insulation layer can also have a thermal conductivity at ambient temperature and vacuum pressure at $10^{-5}$ Torr of 10 mW/m-K or less, 5 mW/m-K or less, or 3 mW/m-K or less.

In another embodiment, the aerogel insulation layer comprises a polyimide aerogel or derivative thereof. The aerogel insulation layer can also be a fiber reinforced aerogel.

In yet another embodiment, the present invention comprises a laminate panel comprising: (a) an aerogel layer having at least two major faces; (b) a facesheet adjacent to at least one major face of the aerogel layer; and (c) a reflective layer adjacent to the facesheet. The panel can include a first facesheet adjacent to a first major face of the aerogel layer, and a second facesheet adjacent to a second major face of the aerogel layer. The panel can also be sealed at the edges by at least one edge seal.

In still another embodiment, the panel includes at least one vent, and at least one vent filter. The panel can also include an edge seal which includes at least one vent and at least one vent filter.

BRIEF DESCRIPTION OF THE DRAWINGS

FIG. 13 illustrates photograph of PI aerogel carbon fiber composites prepared at various target densities.

FIG. 14 illustrates final thickness, density and thermal conductivity for carbon fiber reinforced polyimide aerogels prepared at various target densities.

FIG. 15 illustrates SEM images of PI aerogel carbon fiber composite at a) 30×, b) 250× and c) 150 k× magnifications.

FIG. 16-1 includes a photograph of 4-ply PI aerogel carbon fiber composite quilted using Kevlar thread.

FIG. 16-2 illustrates compressive and flexural strengths for multi-ply carbon fiber reinforced polyimide aerogels.

DETAILED DESCRIPTION

Figure 1:
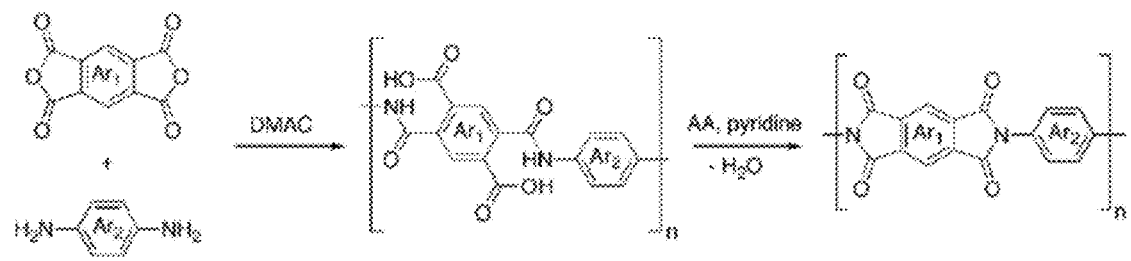
FIG. 1 illustrates the synthetic scheme for making polyimides.

The present invention provides a laminate panel comprising: (a) a polyimide based aerogel layer having two major faces; (b) a facesheet on at least one major face of the aerogel layer; and (c) a reflective layer adjacent to the facesheet. The panel may include a facesheet on both major faces of the aerogel layer. The panel may additionally include edge seals to seal the edges of the panel. The panel may comprise at least one hole in or through the panel.

The polyimide aerogels can be optimized to have specific physical and chemical properties. Specifically, the aerogels of the present invention can be optimized to have a specific combination of flexural strength, flexural modulus, density, and thermal conductivity. The aerogel material can have a flexural strength, without failure, of at least 150 psi, at least 200 psi, or at least 250 psi. The aerogel material can have a flexural modulus, without failure, of at least 5,000 psi, at least 20,000 psi, or at least 40,000 psi. The aerogel material can have a density below 0.25 g/cc, below 0.15 g/cc, or below 0.10 g/cc. The aerogel material can have a thermal conductivity at ambient temperature and ambient pressure below 40 mW/m-K, below 30 mW/m-K, below 20 mW/m-K, or 15 mW/m-K or less. The aerogel material can have a thermal conductivity at ambient temperature in a vacuum of $10^{-5}$ torr below 10 mW/m-K, below 5 mW/m-K, or below 3 mW/m-K.

Figure 18:
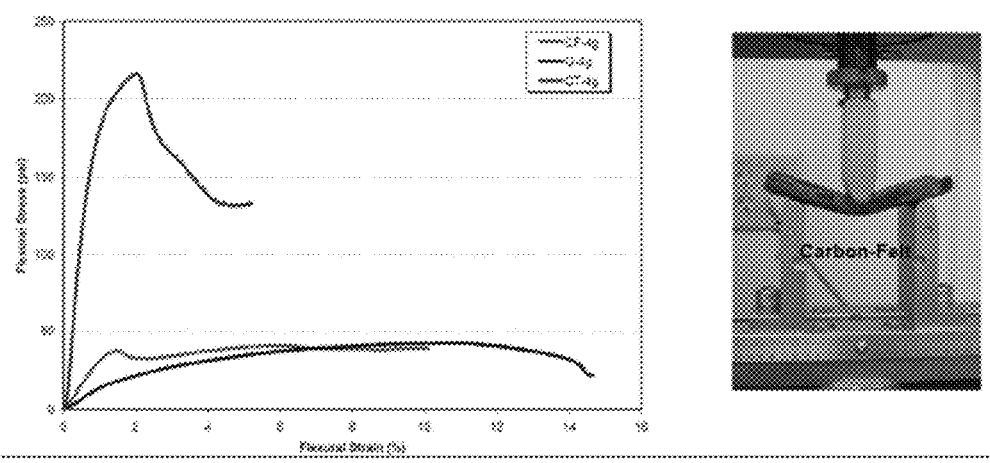
FIG. 18 illustrates flexural stress versus strain curves for various fiber reinforced polyimide aerogels.

The flexural strength of a material is the ability of a material to resist catastrophic deformation under a loaded stress. Flexural strength can be measured using a three point transverse-bending flexural test technique, such as the ASTM D790 test. Generally, the flexural strength is defined by the pressure (psi or Mbar) experienced by a material at the moment of rupture or catastrophic physical event due to loaded stress. This value is typically extracted from a stress-strain curve produced by a flexural strength test for a material (See FIG. 18).

The flexural modulus of a material is the tendency for a material to bend, or more specifically the ratio of stress to strain in flexural deformation of the material. It is determined from the slope of a stress-strain curve produced by a flexural strength test (such as the ASTM D790).

Figure 22:
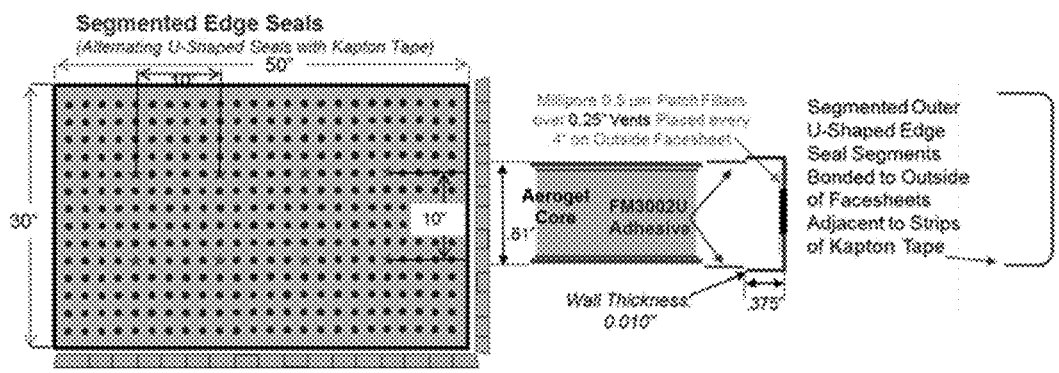
FIG. 22 illustrates a schematic for the segmented edge-seal design.

The laminate panel can also include an edge seal. The edge seal can be continuous along the entire edge of the panel. The edge seal can consist of a segmented design (FIG. 22). In one embodiment, the segmented design can include 2"-long, U-shaped fiberglass seal segments which are distributed along the edge of the panel. The seal segments include 0.25" vents covered by 0.5 μm particle filters. The vents allow air to pass in and out of the panel. This venting is important in aerospace applications because it allows the air pressure inside the panel to normalize with the ambient pressure of the environment as the panel traverses between various elevations. The particle filter prevents any particles from escaping the panel interior during launch evacuation and/or panel outgassing. These segments are bonded to the outside facesheets with a 2" gap between the ends of the segments. The 2" gap between segments is covered with 2-mil Kapton tape to complete the seal of the panel edges. This design offers some significant fabrication advantages in that the 2" long segments of formed edge seal can be pre-made, cut to 2" lengths and inventoried.

The present invention also provides processes for the production of fiber reinforced polyimide aerogel composites. The process includes: (a) forming poly(amic acid) solution from a mixture of dianhydride and diamine monomers in a dipolar, basic solvent such as N,N-dimethylacetamide (DMAc) or N-methylpyrolidone (NMP); (b) casting the poly(amic acid) solution into a fiber batting prior to gelation; (c) gelling the poly(amic acid) solution by chemical imidization using acetic anhydride and pyridine; and (d) removal of the transient liquid phase contained within the gel with supercritical or subcritical CO2 to give a fiber/polyimide aerogel composite. The polyimide aerogels can be produced from aromatic dianhydride and diamine monomers, such as aromatic diamines or a mixture of at least one aromatic diamine monomer and at least one aliphatic diamine monomer. The resulting polyimide aerogel can be optimized to possess low density, meso-pores, narrow pore size distribution and good mechanical strength.

The preparation of polyimide wet gels is a two-step procedure (FIG. 1): (a) formation of the poly(amic acid) solution from a mixture of dianhydride and diamine in a dipolar, basic solvent such as N,N-dimethylacetamide (DMAc) or N-methylpyrolidone (NMP); and (b) catalyzed cyclization with acetic anhydride and pyridine to form polyimide. Previous work with synthesizing polyimide aerogels has shown that the first step typically requires at least 12 hours mixing at room temperature allowing for significant formation of the poly(amic acid) polymer and yielding stable, robust wet gels. Gelation conditions depend on several factors, including the prepared density of the solution. Higher density solutions will gel faster than lower density solutions. Once the system has reached the gelled state, the gels are heat treated in an oven at 65° C. for 16 hours after which time the wet gels are rinsed repeatedly with ethanol. Rinsing occurs at least three times prior to $CO_2$ extraction, and serves to remove residual DMAc solvent and unreacted monomers which are insoluble in neither super- nor subcritical $CO_2$. $CO_2$ can then be used in techniques known to those in the art for wet solvent extraction to create the aerogel structure. Further techniques for preparing and optimizing polyimide aerogels can be found in U.S. patent application Ser. Nos. 10/625,501 and 11/047,200, both of which are incorporated herein by reference in their entirety.

Figure 2:
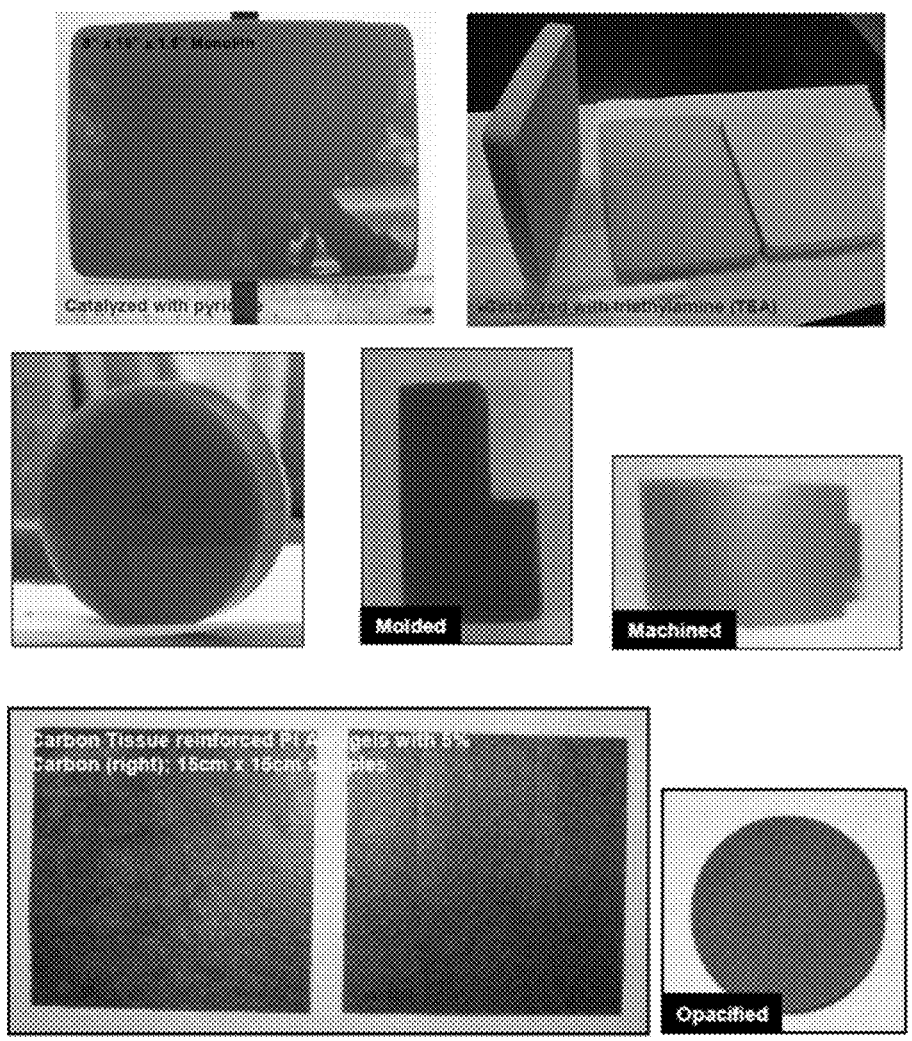
FIG. 2 illustrates a variety of polyimide aerogel form factors: monolith, molded monolith, machine monolith, opacified monolith, and fiber reinforced.

The polyimide aerogels can take a variety of forms (FIG. 2). When the poly(amic acid) solution is catalyzed using acetic anhydride and pyridine, the resulting wet gel and aerogel is transparent and orange-red in color. When catalyzed using triethylamine, the resulting wet gel and aerogel are opaque and yellow in color. Polyimide aerogels can be prepared as free-standing transparent monoliths which can be molded to specific shape or machined in the final aerogel state. Polyimide aerogels can also be reinforced with a continuous fiber batting to provide a stiff board composite material. Finally, the poly(amic acid) solution prior to gelation can be doped with a variety of opacifiers, including carbon black, graphite, carbon nanotubes, metal oxides, metals, titanium dioxide, silicon carbide, phosphates, borates, metal silicates, metallocenes, molybdates, stannates, hydroxides, carbonates, zinc oxides, aluminum oxides, antimony oxides, magnesium-zinc blends, magnesium-zinc-antimony blends, or a combination thereof In one embodiment, silica components are also present in the aerogels of the present invention. Silica may be incorporated into the polyimide matrix either as physical mixture or it may be bound covalently to the polyimide. U.S. patent application Ser. No. 13/299,677 describes some of such covalently bonded silica-polyimide hybrid aerogels, which is incorporated by reference in its entirety. In another embodiment, the polyimide aerogels of the present invention are carbonized. Carbonization results in at least some of the polymeric materials being converted to carbon using various known techniques, such as pyrolysis. In a preferred embodiment, the polyimide aerogels are heated to elevated temperatures sufficiently high to induce pyrolysis. Typical pyrolysis temperatures range between 500° C. and 2000° C. Temperature may be increased to reduce the nitrogen content of the resulting carbon aerogel. Pyrolysis is typically carried out in an inert atmosphere (i.e. nitrogen, helium, neon, argon or some combination). The nitrogen content of the carbon aerogels may be from 0% to 20%.

The present invention further provides a processes for fabricating laminate, sandwich panel composites comprised of fiber reinforced polyimide aerogels composites and facesheets. The panels can also include additional elements such as reflective protection layers, edge-seals, vents, filters, and inserts for component mounting. The process includes: (a) providing an aerogel layer having two faces, and at least one facesheet; (b) cleaning and optionally abrading the surfaces of the aerogel and facesheet to prepare for adhesion; (c) applying a film adhesive to the facesheet; (d) combining the facesheet and aerogel layer so the facesheet adheres to the face of the aerogel layer; and (e) curing the aerogel-facesheet laminate to complete adhesion.

The following examples provide various embodiments and properties of the present invention.

Example 1

Figure 3:
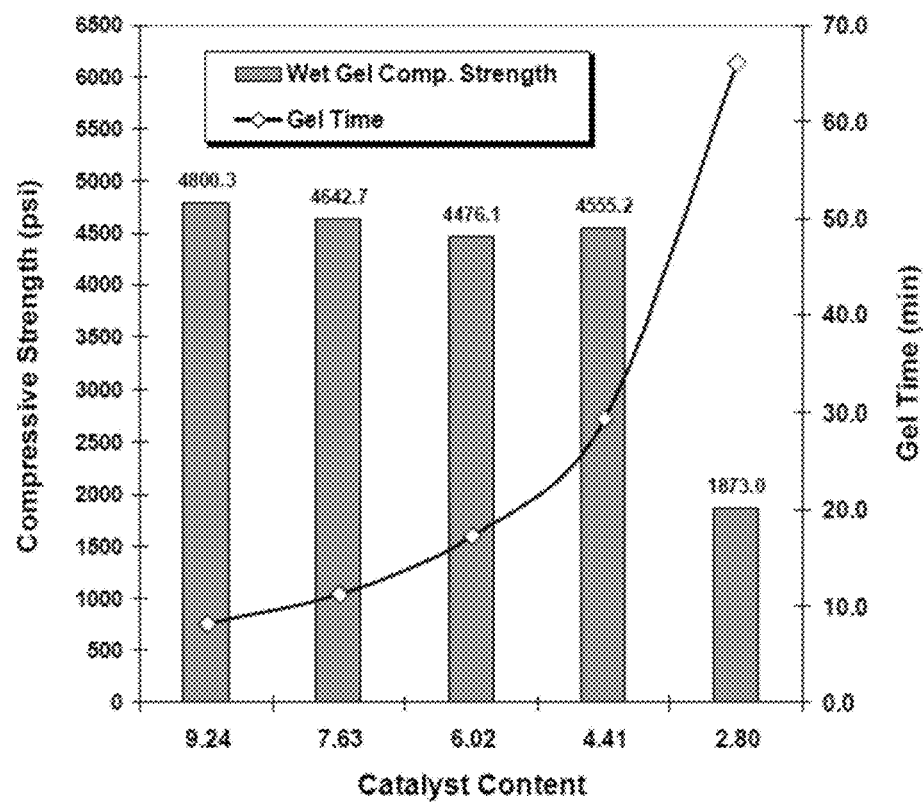
FIG. 3 illustrates compressive strength of wet polyimide gel and gelation time versus catalyst concentration.

The gel strength of polyimide wet gel was measured for a system prepared with initial target density (i.e. solids content) of 0.085 g/cc as a function of the catalyst concentration. Catalyst content in FIG. 3 represents the combined molar ratio of acetic anhydride and pyridine. The wet gel compressive strength measured after 24 hours of syneresis was found to be approximately 4600 psi for catalyst contents ranging between 9.2 and 4.4. When the catalyst concentration was 2.8, the gel time was considerable longer and the resulting wet gel strength was nearly half (1900 psi) as those with higher catalyst contents.

Example 2

Figure 4:
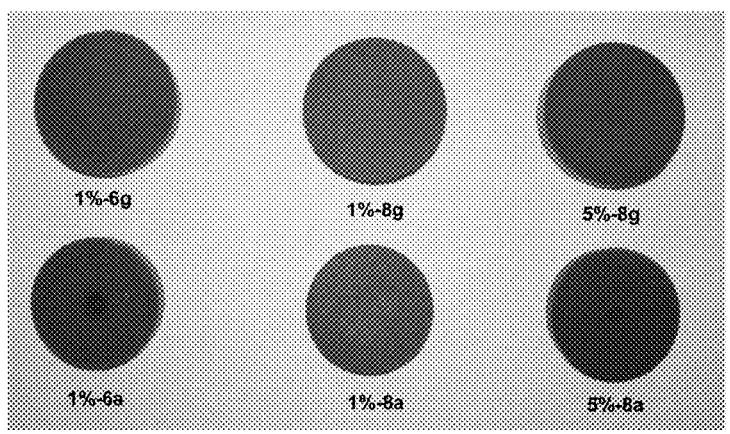
FIG. 4 describes non-carbonized green (g) and annealed (a) carbon-opacified PI aerogel monoliths.

Carbon black (from Cabot-Monarch 1300) was used as an opacifier in the preparation of polyimide aerogel monoliths in order to reduce the thermal conductivity. Opacifiers with sub-micron particle size are preferably used as an additional heat dissipating material. The poly(amic acid) sol as described previously that was used to prepare unopacified PI aerogel monoliths was also employed for the synthesis of carbon-opacified PI aerogel monoliths. Target densities of 0.03, 0.06 and 0.08 g/cc were prepared with 1 and 5 wt % carbon. It is not preferable to add the opacifier at earlier stages of PI formation as it may result in obstructed polymerization growth, and weak gels. Preferably, adding the opacifier at 1 and 5 wt % (relative to total solid content) after acetic anhydride but before pyridine catalysts, helps preserving the integrity of the polymerization. To prevent possible sedimentation of the carbon prior to gelation, the solutions were ultrasonicated for 15 minutes, and after the gels were casted, they were immediately heated at 65° C. for 16 hours (overnight). Likewise, the wet gels were rinsed three times with ethanol prior to $CO_2$ extraction. Pictures of carbon-opacified PI aerogels can be seen in FIG. 4.

Figure 5:
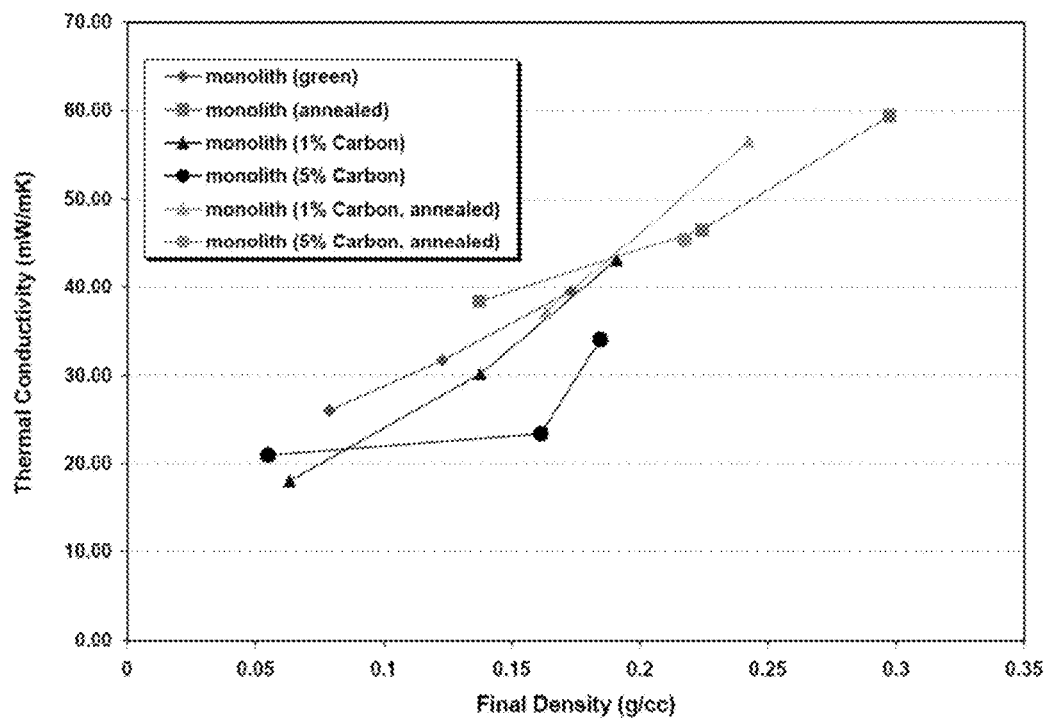
FIG. 5 illustrates the thermal conductivity versus final density for opacified and unopacified PI aerogels.

Opacification led to nearly a 10 unit decrease in thermal conductivity when 5 wt % carbon was employed. This is evident in FIG. 5 and Table 1.

TABLE 1

Physical Characteristics of Carbon-Opacified PI Aerogel Monoliths.

| | Target Density (g/cc) | Final Density (g/cc) | Thermal Conductivity (mW/m-K) |
|---|---|---|---|
| 1%-3g | 0.03 | 0.0633 | 18.1 |
| 1%-6g | 0.06 | 0.1377 | 30.1 |
| 1%-8g | 0.08 | 0.1909 | 43.0 |
| 5%-3g | 0.03 | 0.0549 | 21.0 |
| 5%-6g | 0.06 | 0.1614 | 23.4 |
| 5%-8g | 0.08 | 0.1845 | 34.0 |
| 1%-6a | 0.06 | 0.1633 | 37.1 |
| 1%-8a | 0.08 | 0.2425 | 56.5 |
| 5%-8a | 0.08 | 0.2174 | 45.3 |

For instance, 1%-8 g had a TC of 43.0 mW/m·K. 5%-8 g had nearly the same final density but a TC value of 34.0 mW/m·K. For those samples that were annealed, 1%-6a, 1%-8a and 5%-8a, the result is consistent with unopacified PI aerogel monoliths in that density increases after annealing leading to an increase in TC. This demonstrates the potential for opacification to reduce thermal conductivity at least at ambient conditions. It is expected that this observation would be more dramatic at elevated temperatures where contributions to radiant heat transfer are greater. Opacification above 5 wt % carbon tended to decrease the strength of the aerogels, especially at lower densities, and was therefore not considered for further study.

Example 3

Figure 6:
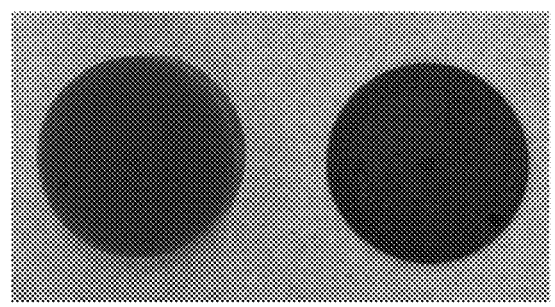
FIG. 6 illustrates polyimide aerogel monolith before and after uniaxial compression.

Uniaxial compression analysis of the samples of the present invention was tested using an Instron (Model 5569) with a 50 kN load cell and crosshead speed of 0.050"/min. Stress-strain curves were determined for each density of PI aerogel monolith and compressive Young's modulus, E, was calculated. When PI aerogel monoliths are compressed uniaxially, their compression profiles are comparable to organic foams. At lower strains, the initial slope (between ~2 and 5% strain) is used to calculate Young's modulus. It is believed that at this stage of compression, the monolith possesses elastic properties. Past the initial slope, the sample exhibits a plateau where, as strain increases, the stress minimally increases. At this compressive stress the cells irreversibly collapse, and as long as there is a narrow distribution in cell size, the plateau region shall remain relatively horizontal. As the cells completely collapse with continued strain, opposing cell walls compress and solid pushes against solid. This is reflected in a rapid increase in stress and is commonly referred to as densification. FIG. 6 shows a PI monolith before and after compression.

Example 4

Figure 7:
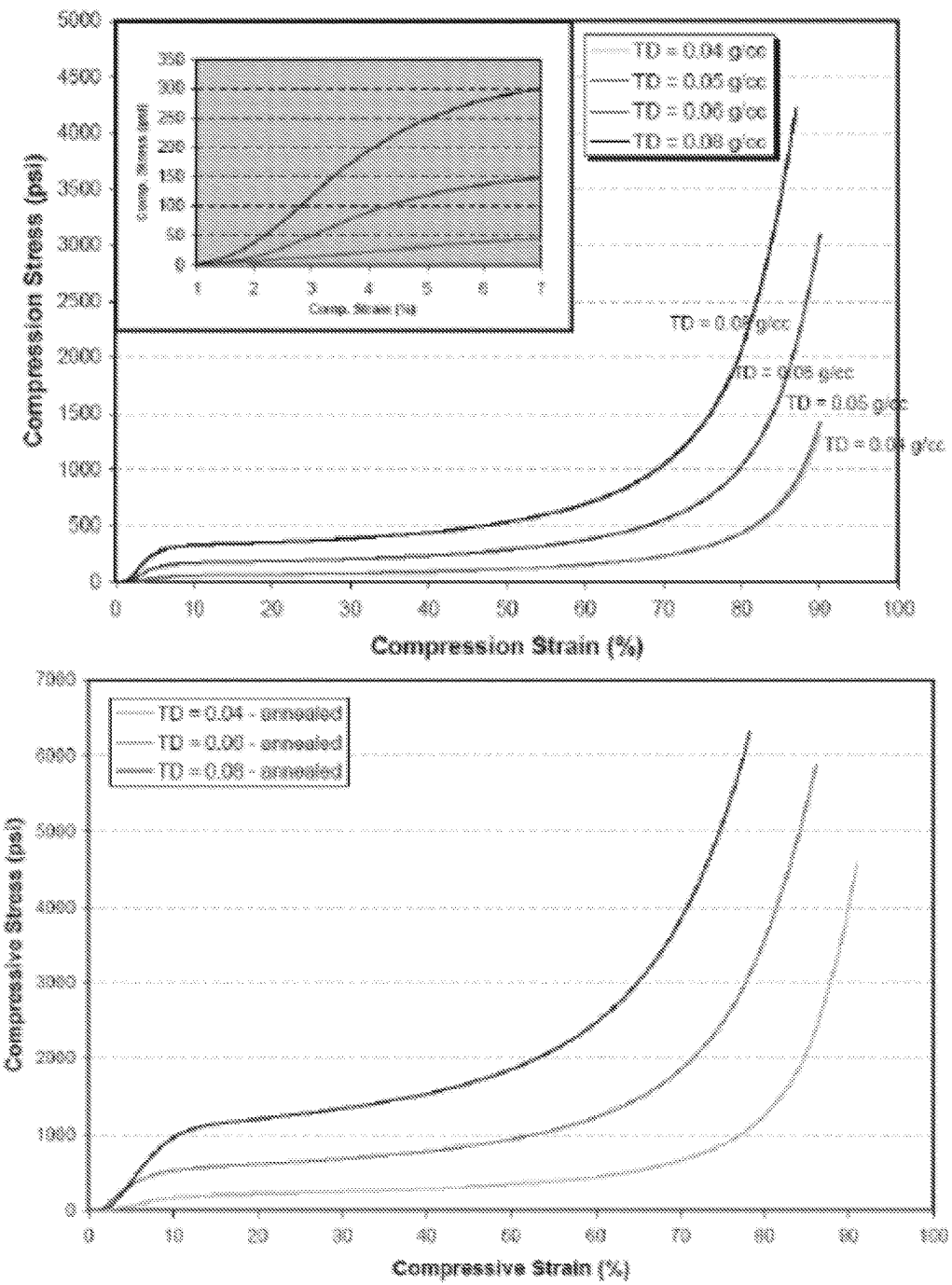
FIG. 7 illustrates compressive strength versus strain data for polyimide aerogel monoliths.

The compressive strengths for PI-4, PI-5, PI-6, PI-8, PI-4a, PI-6a and PI-8a were measured from their corresponding stress-strain curves shown in FIG. 7 and listed in the accompanying table. The entire stress-strain curve for each of the densities reveals the aerogel's unique ability not to splinter, crack, or break during a compressive load. Compared with silica aerogels which are extremely dusty and very brittle, this is an important characteristic when considering custom applications that require machining and minimal particle shedding. The Young's modulus was calculated from the slope over the range of 2% and 5% strain. It is evident from the data that as density increases so does the Young's modulus and the onset of cell collapse. It appears to be consistent that after about 5% strain, regardless of density, pore collapse begins.

Figure 8:
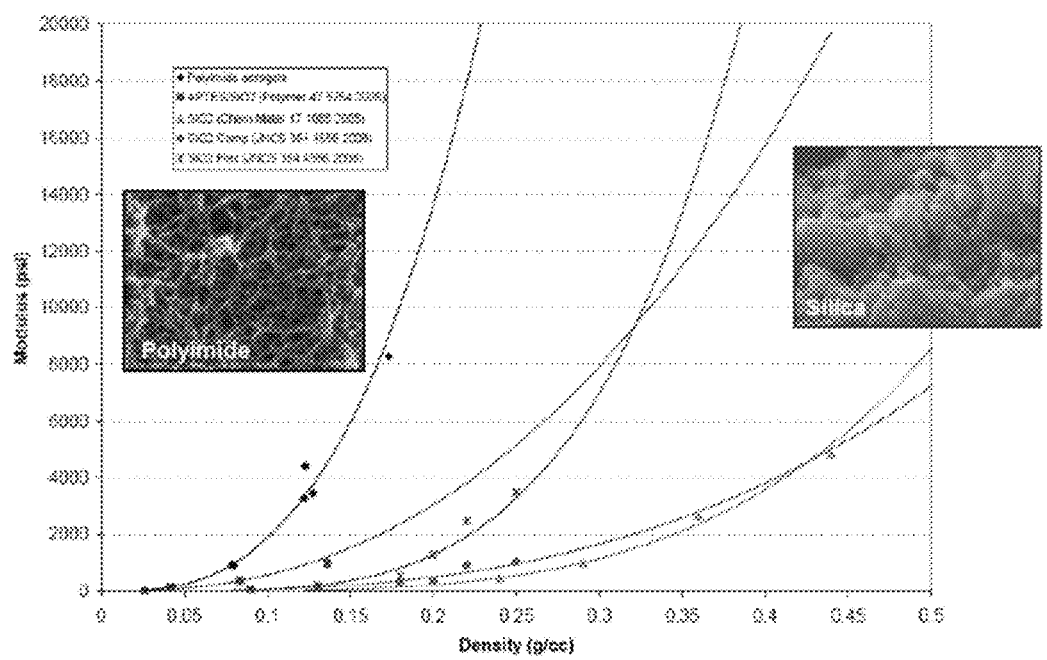
FIG. 8 illustrates compressive modulus versus density for polyimide, silica and silica-hybrid aerogel monoliths.

The typical relationship between compressive modulus and density follows a power law function. As seen in FIG. 8 the strength of PI aerogels increases at a faster rate, with respect to a rising density, than any other silica or silica hybrid systems.

Example 5

Reinforcing PI aerogels was considered as a means to increase the overall mechanical strength and ease of handling while still maintaining final densities within program requirements. As will be described later, reinforcement into polyimide aerogel not only increased the flexural strength but also lowered the thermal conductivity (TC) from their parent unopacified, non-reinforced PI aerogel monoliths. Three batting materials—or substrates—were chosen for this study: carbon felt (CF) with a density of 0.094 g/cc and measured TC of 34.4 mW/m·K (hot-plate tested under ambient conditions at room temperature), Quartzel® (from Saint-Gobain, abbreviated here as Q) with a density of 0.0069 g/cc and measured TC of 38.6 mW/m·K, and Carbon Tissue (from Technical Fibre Products, Inc.; abbreviated as CT) with a density of 0.0396 g/cc and measured TC of 27.2 mW/m·K.

Figure 9:
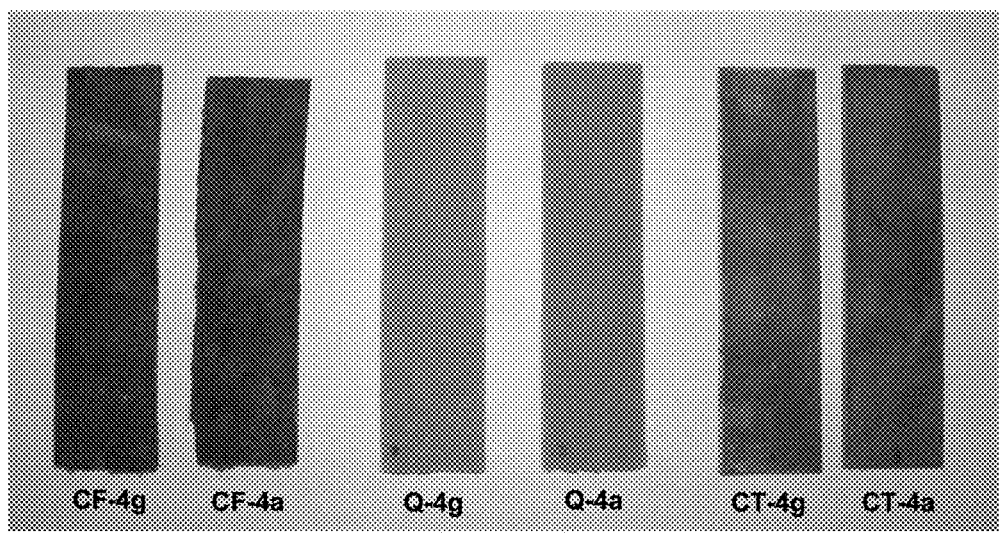
FIG. 9 illustrates pictures of PI reinforced aerogels.

Reinforced PI aerogels were prepared by making polyimide solutions with initial target densities 0.03, 0.04, 0.06 and 0.08 g/cc. Depending on the initial density and size of substrate, a predetermined volume of polyimide solution was prepared in order to completely fill the substrate. After acetic anhydride and pyridine were sequentially added to the poly(amic acid) solution, depending on the predetermined gel time, the solutions were casted directly into the substrates contained within a polypropylene mold. The PI solution easily penetrated through the fibers, which did not interfere with the expected times of gelation. Once the solutions gelled, the wet gels were heated at 65° C. for 16 hours to allow for gel strengthening. Prior to $CO_2$ extraction, the gels were rinsed at least three times daily with ethanol in order to remove residual solvent, catalysts, and unreacted monomers. Pictures of green and annealed reinforced PI aerogels can be seen in FIG. 9.

Figure 10:
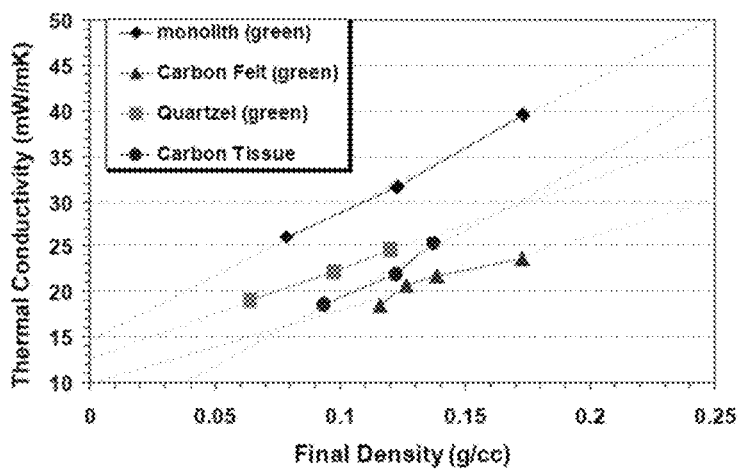
FIG. 10 illustrates density and thermal conductivity data for fiber reinforced polyimide aerogel monoliths.

When PI aerogels are reinforced with Carbon Felt, Quartzel®, or Carbon Tissue, we see a general decrease in thermal conductivity (FIG. 10). Although with Carbon Felt we saw a considerable decrease in thermal conductivity (TC ranging from 18.5 to 23.6 mW/m·K), the final density was too far above the desired target density for the program, CF-4 g with final density of 0.1159 g/cc. Additionally, this sample exhibited significant shrinkage and cracking post extraction and annealing due to a non-uniform shrinking of the substrate with respect to the PI aerogel. Quartzel®, a much lighter fiber, however, exhibited low final densities and low thermal conductivities (19.0 to 24.6 mW/m·K) but also shrank non-uniformly. The quality of this final composite was generally weak but flexible, characteristics not required for a structural satellite panel. An aerogel which utilizes this substrate may be a strong candidate for other applications requiring flexibility and good thermal performance. Lastly, Carbon Tissue demonstrated low densities, low thermal conductivities and no shrinkage during extraction and annealing. One example is CT-4 g with a final density of 0.0936 g/cc and thermal conductivity of 18.6 mW/m·K. Carbon tissue is a batting formed from long carbon-based fibers that primarily run in a planar manner in the lateral x- and y-directions. This gives Carbon Tissue its remarkable rigidity. As a result, Carbon Tissue was chosen as the downselected substrate to be used for further reinforcement experiments.

Example 6

Figure 11:
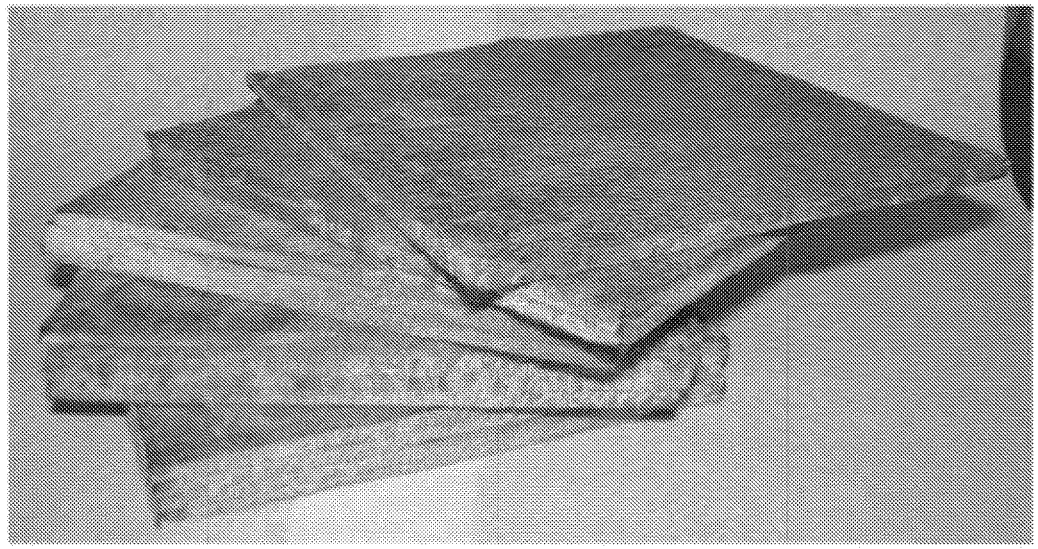
FIG. 11 illustrates thermal conductivity, thickness and density for 1, 2, 3 and 4-ply stack-ups of fiber reinforced polyimide aerogels.
Figure 11:
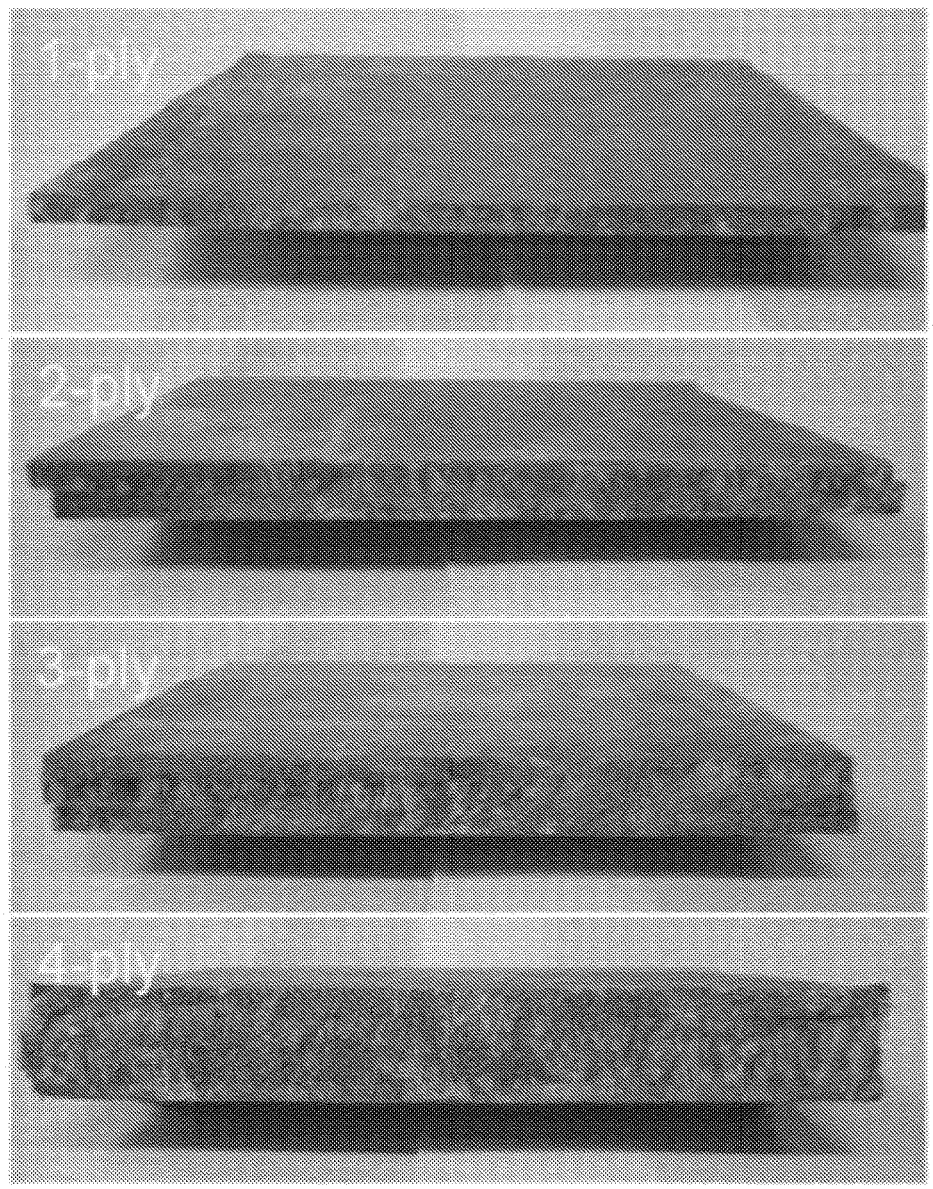

To increase thickness of the aerogel/fiber composites we pre-laid up 6"×6" carbon fiber battings in 1-, 2-, 3- and 4-ply thicknesses. The poly(amic acid) solution with a target density of 0.045 g/cc was casted atop the multi-ply layups and allowed to gel. The samples are then aged, rinsed and supercritically dried to afford the samples shown in FIG. 11. Prior to any thermal or mechanical testing, the composites were heat treated at 200° C. for 20 minutes to complete imidization and drive off any residual solvents. After each of these steps there was no evidence of inter-ply or ply-ply delamination, suggesting a continuous PI aerogel network through the composite.

Figure 12:
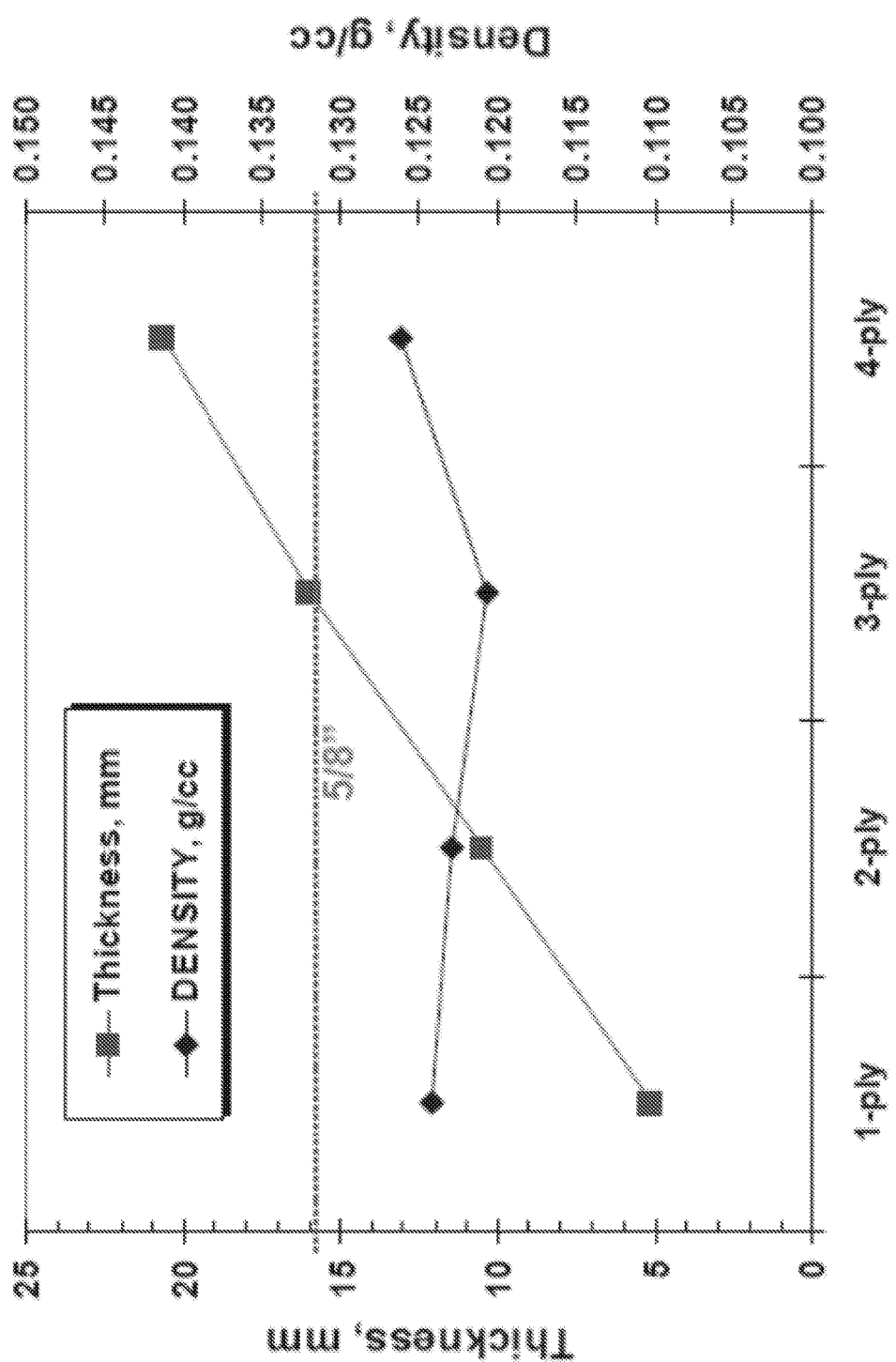
FIG. 12 illustrates a plot of thickness and density of multi-ply stack-ups of fiber reinforced polyimide aerogels.

For each prepared multiple-ply layup (described above), the density and thermal conductivity were measured for each composite at ambient temperature and pressure. The final densities for all plies were all within error of each other, 0.12 g/cc. Weight and thickness increase linearly with the number of plies. A single ply composite exhibited final thickness of approximately 5 mm. To achieve a ¾" ITS panel core would require a 3 or 4-ply layup, 0.63" and 0.81", respectively. Thermal conductivity was also not effected by increasing the number of plies. A single ply layup had a thermal conductivity of 21.8 mW/m-K, but as the number of plies increased to 2, 3 and 4 plies, the TC did not change significantly, 20.7, 19.3, 20.1 mW/m-K, respectively. These trends and data are demonstrated in FIG. 12.

Example 7

A series of PI aerogel carbon fiber 6"×6" composites were prepared according to the same methods as described previously but with higher target densities, i.e. with greater solid contents in the poly(amic acid) sol prep (FIG. 13). We were motivated to increase the density as an effort to increase the overall strength of the composite. According to target density studies, the compressive strength of monolithic PI aerogel samples increases exponentially. While using the same carbon fiber reinforcement, target densities of 0.04, 0.05, 0.06 and 0.07 g/cc were prepared.

FIG. 14 summarizes the physical characteristics of these composites. The sample with a target density of 0.04 g/cc was prepared as a control with a thickness of 5.06 mm and final density of 0.120 g/cc. By increasing the target density, we see a slight decrease in the final thickness and an expected increase in final density. About a 0.5 mW/m-K increase of thermal conductivity was observed for each unit increase in the target density.

Example 8

The PI aerogel carbon fiber composite was investigated by scanning electron microscopy (SEM) in order to understand the continuity of the aerogel network within the composite and the interface between aerogel and fiber. It is believed that composite materials where the connection between multiple components is strong will exhibit greater mechanical strength. Discontinuities in the form of gaps or micro-cracking result in diminished mechanical integrity. According to the SEM images seen in FIG. 15 of a PI aerogel/carbon fiber composite, at 30× magnification it is evident that the PI aerogel material is continuous throughout the fiber. However, at closer inspection at 250× magnification, there is an obvious lack of connectivity between the carbon fiber reinforcement and the PI aerogel. This behavior is reflected in the poor transverse compressive and tensile strengths observed for this material. Because the carbon fibers in the batting are predominantly in the x,y plane and very stiff and therefore high flexural strength, when the PI gel undergoes shrinkage, the aerogel shrinks away from the fiber leaving behind gaps at the micron level. It is obvious that during a flatwise compression test, a sample will exhibit low compression strength, especially at low composite density. The image at 150 k× illustrates the fibrillar network typical for PI aerogels at Aspen Aerogels.

Figures 1, 16:
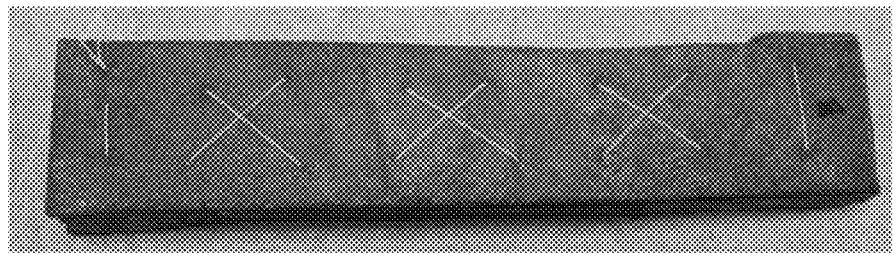
Figures 2, 16:
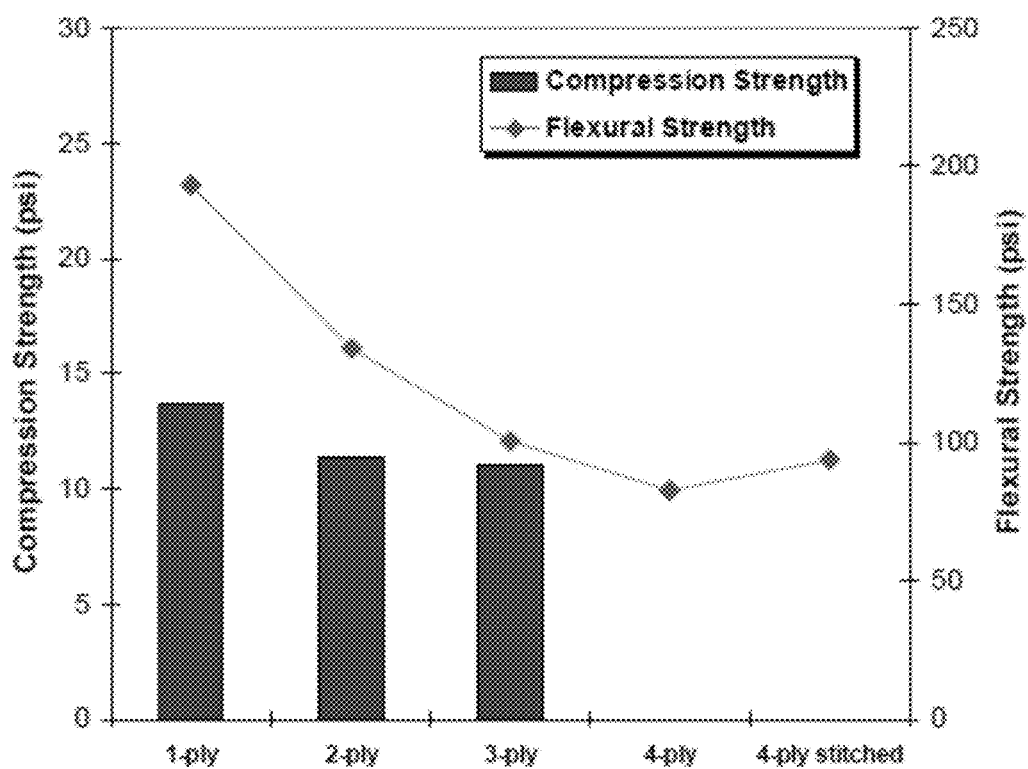

In order to increase the tensile strength in the z-direction, we quilted (by hand) a multiple-ply layup using Kevlar thread (size 46) in a cross-stitch pattern as seen in FIG. 16. The quilted composite sample was noticeably stronger. When tested for flexural strength, a 13% increase strength was observed. FIG. 16 proves that ply-ply shear stresses were alleviated by quilting and therefore sustained higher flexural loads.

Example 9

Uniaxial compression analyses of the reinforced samples described above with TD=0.04 g/cc were examined using an Instron (Model 5569) with a 50 kN load cell and crosshead speed of 0.050"/min. Stress-strain curves were determined for each reinforced PI aerogel and compressive Young's modulus, E, was calculated.

Figure 17:
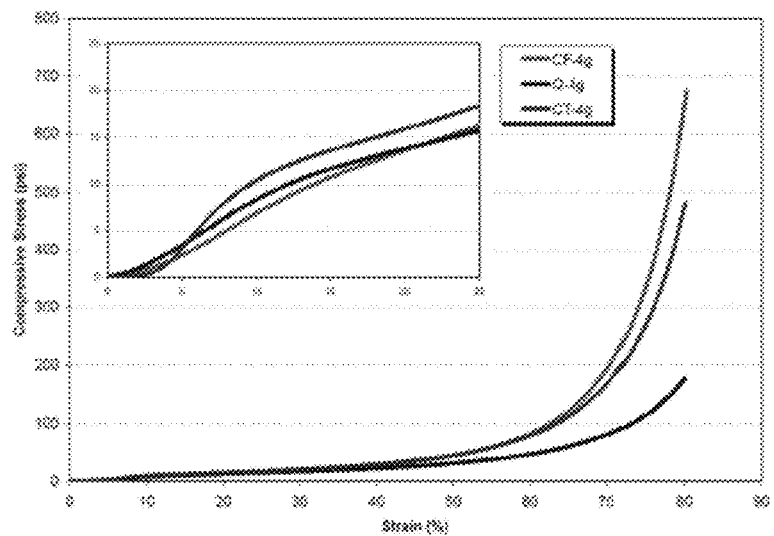
FIG. 17 illustrates compressive stress versus strain curves for various fiber reinforced polyimide aerogels.

The compressive strengths for CF-4g, CF-4a, Q-4g, Q-4a, CT-4g, CT-4a were measured from their corresponding stress-strain curves shown in FIG. 17 Compared with silica aerogels, which are extremely dusty and very brittle, non-reinforced and reinforced PI samples show minimal particle shedding and dust. A Young's modulus and maximum compressive stress were determined for each sample and summarized in FIG. 17. Overall, reinforcement of PI aerogels leads to lower thermal conductivities at the expense of lower maximum compressive stresses and lower Young's moduli. A non-reinforced PI aerogel monolith prepared with TD=0.04 g/cc has a maximum compressive strength of 57.3 psi and a compression modulus of 816.7 psi. When a PI aerogel of the same density is reinforced with carbon felt, Quartzel®, and Carbon Tissue, the maximum compressive strengths are 11.7, 10.7 and 11.5 psi and compression moduli of 91.8, 90.4 and 182.4 psi. The Carbon Tissue substrate afforded the highest compressive strengths amongst all of the fibers due in part to its unique fiber layout. As expected, the annealed samples exhibited higher strengths, a reflection of the increased density upon heating.

Example 10

Mechanical analysis of the same reinforced PI aerogels also includes 3-point flexural testing according to the design outlined by ASTM D790. Flexural testing provides insight to alternative stresses other than compression. For example, when a panel is flexed, the sample undergoes both tension and compression stresses but in the lateral (x,y) direction. These stresses cannot be measured in a uniaxial (z-direction) compression test alone. Stress-strain curves were measured for the green and annealed reinforced samples with TD=0.04 g/cc (FIG. 18), and the data is summarized in FIG. 18. In contrast to the compressive strength of the reinforced PI aerogels, the flexural strength in most instances exceeded that of the non-reinforced PI aerogel monolith. The Carbon Tissue substrate exhibited the greatest flexural strength of 186 psi and a Young's modulus of 26,892 psi. The combined flexural strength and low thermal conductivity makes CT-4 g a prime candidate for further development.

Figure 19:
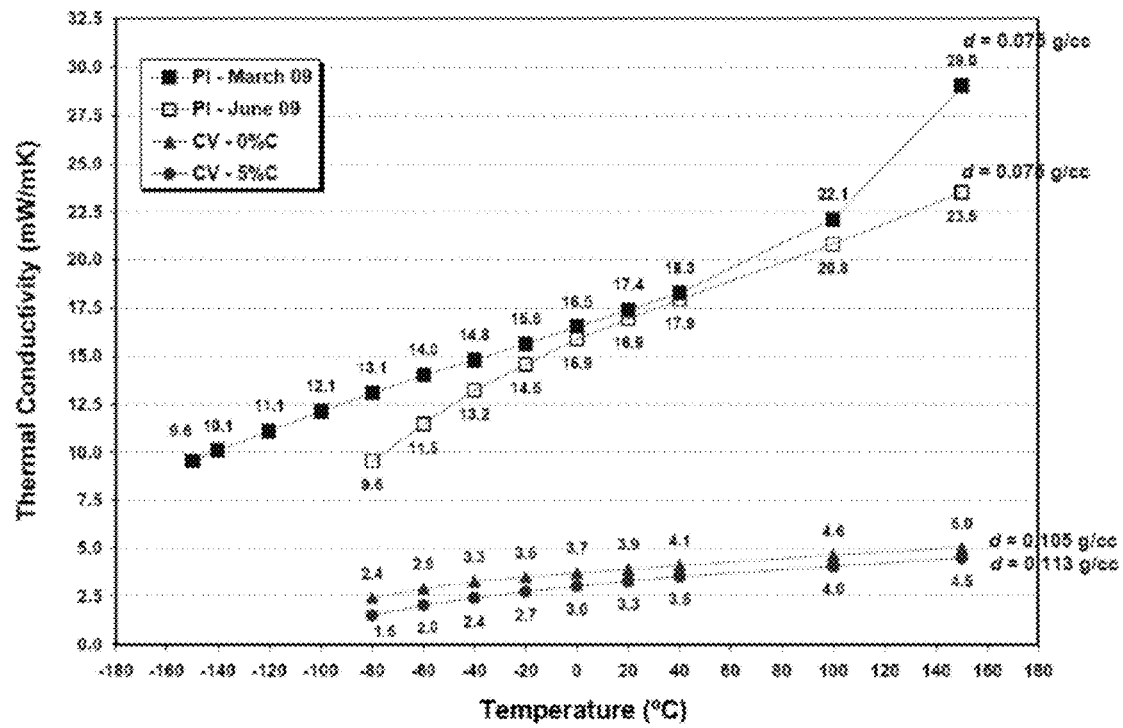
FIG. 19 illustrates vacuum-level thermal conductivity versus temperature of monolith and carbon fiber reinforced polyimide aerogels.

The fiber reinforced PI aerogel composite exhibited excellent thermal conductivity in a vacuum of $10^{-5}$ torr. FIG. 19 shows how this material compares with non-reinforced polyimide aerogel in vacuum over the temperature range of 193 K up to 423 K (−80° C. to 150° C.). As can be seen, the thermal conductivity of this material was measured at a very low 1.5 mW/m-K at a sample temperature of 193 K (−80° C.) and then rose to 4.5 mW/m-K at 423 K (150° C.). In looking at FIG. 19, we believe that the dramatic drop in thermal conductivity in the carbon veil (a thinner variant of carbon tissue) material was due to the cumulative opacifying effect of the carbon veil reinforcement with the addition of the 5% carbon black opacifier further improving the results. By adding these opacifiers to the polyimide aerogels, the radiative component of heat transfer was greatly reduced; thereby, bringing the overall thermal conductivity down to a range of 1.5 mW/m·K at 193 K up to 4.5 mW/m·K at 423 K, as shown in FIG. 19.

Example 11

Figure 20:
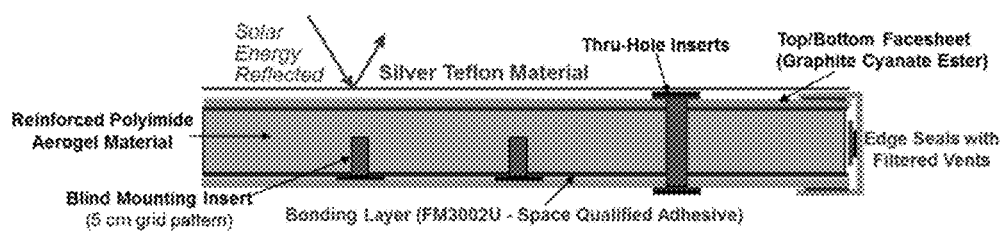
FIG. 20 illustrates a schematic and prototype of sandwich composite panel equipped with inserts and edge-seals containing carbon fiber reinforced polyimide aerogel.
Figure 21A:
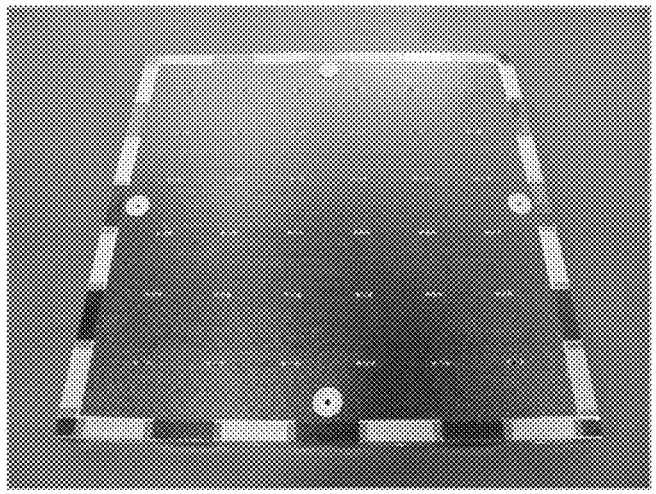
FIGS. 21a-21k illustrate steps for installing blind insert into sandwich composite assembly.
Figure 21B:
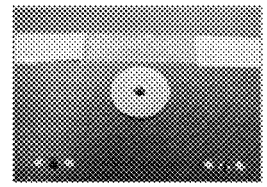
Figure 21C:
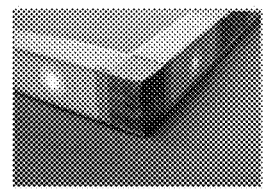
Figure 21D:
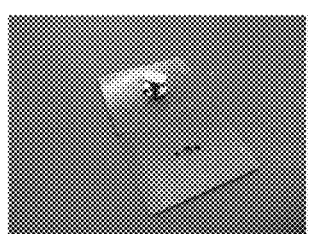
Figure 21E:
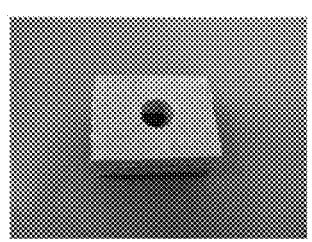
Figure 21F:
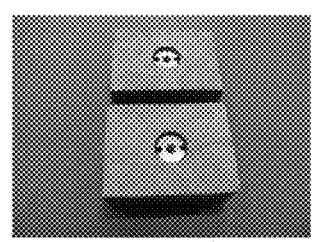
Figure 21G:
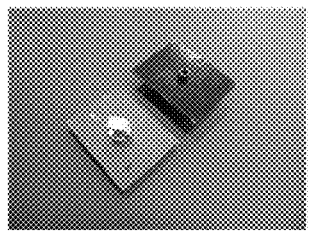
Figure 21H:
Figure 21I:
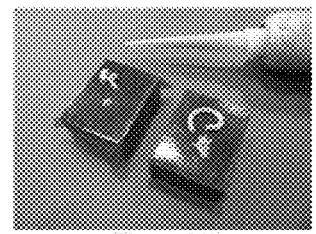
Figure 21J:
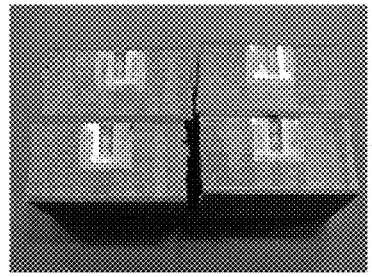
Figure 21K:
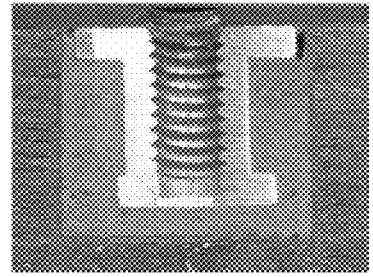

A pictorial representation of a sandwich panel composite, where the structural and thermal functions are integrated into a single component, is shown in FIG. 20, along with pictures of 14"×14" manufactured prototype panel. This sandwich panel was manufactured by a ply to ply bonding process of the fiber reinforced polyimide aerogel core material with low thermal conductivity (3.3 mW/m-K at $10^{-5}$ torr at 20° C.) and good mechanical properties (flex strength ~700 psi and shear strength of 120 psi) to facesheets with adhesive, an array of blind and thru-hole inserts were incorporated, along with a segmented edge-seal close-out system.

The following description provides details of a specific embodiment of the manufacturing of laminar panels of the present invention.

Materials:

Substrates to be bonded are PI aerogel carbon fiber composite and graphite—cyanate ester (Gr/Ce) skins for sandwiched samples. The aerogel can be single layer or multiple layers. A film adhesive with density of 0.030 lbs./ft² FM300-2U, which is space-qualified is used in this embodiment.

Surface Preparation:

All bonding surfaces were initially cleaned. Gr/Ce surface was abraded to a dull mat finish and wiped clean with alcohol moistened alcohol wipes until wipe comes clean and kept clean during the bonding process. Blot the bonding surfaces with alcohol moistened wipe as required to remove any incidental surface contaminants. Gently remove any loose aerogel debris from cut edges as needed. Take care to not knock loose additional debris.

Sandwich Bond/Cure Process:
1. Wipe Gr/Ce skins with alcohol moistened wipe until wipe comes clean. Allow 10 minutes for alcohol to flash at RT.
2. Remove any loose debris of aerogel on core edges and if required, blot core with alcohol moistened (not saturated) wipes and allow for 20 minutes for alcohol to flash at RT. This is a guide line; this material is very surface porous and may require prolonged elevated temperature (120° F. for 30 minutes) to get all alcohol to flash from pores. For core of this type, it is best to wear proper protective gloves and clean surfaces that come in contact with the core material to prevent any contamination that will require cleaning prior to bond.

3. Apply film adhesive to skins. Use heat of hands to tack for smaller sized samples or for larger samples, vacuum bag and compact at full vacuum (−12 psi) for 15 minutes. Sometimes areas will be bare due to film adhesive fracturing and flaking off before or after the adhesive application process. Repairs to these areas can be made using the same film adhesive.
4. Stack up the sandwich laminate. As required, provide edge dams to protect the sides of core from side pressure from vacuum bag.
5. Bag for cure with appropriate temperature controls. Applying full vacuum (−12 psi) to sandwich stack up check for leaks and cure.
6. Cure by ramping up at 3°-5° F. per minute until the temperature reaches 250°±10° F. and hold at this temperature range for 90 minutes minimum.
7. Cool down at 3°-5° F. per minute to lower than 150° F.
8. Vent vacuum and remove from tool.

Laminating Multilayer Core Bond/Cure Process:
1. Remove any loose debris of aerogel on core edges and if required, blot core with alcohol moistened (not saturated) wipes and allow for 20 minutes for alcohol to flash at RT. This is a guide line; this material is very surface porous and may require prolonged elevated temperature (120° F. for 30 minutes) to get all alcohol to flash from pores. For core of this type, it is best to wear proper protective gloves and clean surfaces that come in contact with the core material to prevent any contamination that will require cleaning prior to bond.
2. Apply film adhesive to core layers. Tacking is difficult on this type of surface, perform repairs in bare spots as needed using the same film adhesive. Full vacuum (~12 psi) for 30 minutes to assure the adhesion.
3. Stack up the core multiply. As required, provide edge dams to protect the sides of core from side pressure from vacuum bag.
4. Bag for cure with appropriate temperature controls. Applying full vacuum (−12 psi) to multilayered core stack up check for leaks and cure.
5. Cure by ramping up at 3°-5° F. per minute until the temperature reaches 250°±10° F. and hold at this temperature range for 90 minutes minimum.
6. Cool down at 3°-5° F. per minute to lower than 150° F.
7. Vent vacuum and remove from tool.

A step-by-step procedure for installing a partial penetration, or "blind", insert into a multi-ply lay-up of fiber reinforced polyimide aerogels (FIG. 21). Since the inserts are typically made of metal, in order to eliminate direct heat leakage through the z-direction of the panel, a method was developed to securely install inserts with partial penetration into the thickness of the panel. This type of insert is co-cured with a pre-drilled facesheet and then installed as a single component into an already bored out aerogel core.

The edge seal consists of a segmented design (FIG. 22). In this design, the U-shaped seal segments were produced in 2" long segments with 0.25" vents covered by 0.5 μm particle filters to prevent any particles from escaping the panel interior during launch evacuation and/or panel outgassing. These segments would then be bonded to the outside facesheets with a 2" gap between the ends of the segments. This 2" gap would then be covered with 2-mil Kapton tape to complete the seal of the panel edges. The wall thicknesses for these formed segments were 0.010" to minimize the amount of conducted heat leakage along the edge seal. This design offers some significant fabrication advantages in that the 2" long segments of formed edge seal can be pre-made, cut to 2" lengths and inventoried. Fiber glass was the chosen material for the formed segments of this edge seal design because of its very low added heat leakage and reduced weight.

Example 12

Table 2 lists all of the mechanical tests (shear, flexural, compression and tensile), the number of samples, and panel configurations for the PI aerogel sandwich composites. Two sets of 4-point bend flexural tests were performed, three 3"×8" coupons each with and without the 5 cm required grid pattern and according to ASTM C-393 and included graphite cyanate ester facesheets, with no edge seals or thru-hole inserts. Shear testing, according to ASTM C-273, was conducted on five aerogel core only samples having the dimensions 3"×4"×0.75". Flatwise tensile testing, according to ASTM C-297, was performed on aerogel core only 2"×2" samples. It was also of interest to understand how the thru-hole inserts would add to the tensile strength, so three 6"×6" samples with facesheets were prepared and tested having only one thru-hole insert installed at the center of the panel. Lastly, 2"×2" core only samples were tested for flatwise compression according to the ASTM D695.

TABLE 2

Prepared Mechanical Test Coupons and Configurations.

| Item | Test | ASTM | No. Samples | Dimensions | Configuration |
|---|---|---|---|---|---|
| 1 | 4-Point Bend | C-393 | 3 | 3" × 8" × 0.8" | Core + facesheet, no edge seals or inserts |
| 2 | 4-Point Bend | C-393 | 3 | 3" × 8" × 0.8" | Core + facesheet, 5 cm grid of blind inserts, no edge seals or thru-hole inserts |
| 3 | Shear | C-273 | 5 | 3" × 4" × 0.75" | Core only |
| 4 | Flatwise Tensile | C-297 | 5 | 2" × 2" × 0.75" | Core only |
| 5 | Flatwise Tensile | C-297 | 3 | 6" × 6" × 0.8" | Core + facesheet, one thru-hole insert |
| 6 | Flatwise Compression | D-695 | 5 | 2" × 2" × 0.75" | Core only |

Figure 23:
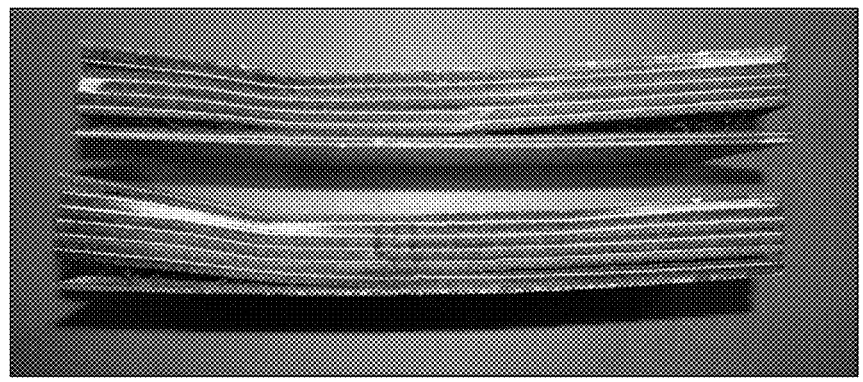
FIG. 23 illustrates 3"×8" panel coupons after 4-point bend testing, indicating delamination at the edges between facesheets and PI aerogel core.

The first set of samples tested included three coupons each for 4-Point Bend (according to ASTM C-393)—3 with no inserts and 3 with the 5 cm grid of blind inserts. According to the data observed in Table 3, there is little variability between measurements, and the installation of blind inserts does not appear to affect the flexural behavior of the coupon-sized panels. Maximum flexural loads were observed between about 325 and 380 lbf (flexural load) with displacements of approximately −0.23 and −0.89 inches. The amount of displacement required to initiate coupon failure indicates that the sandwich composite is fairly flexible. The method of failure in all cases was shear delamination at the facesheet/core interface (FIG. 23).

TABLE 3

Results for 4-Point Bend Flexural Test.

| Coupon | No. of blind inserts | Coupon thickness, in. | Flexural load at max. flexural load (lbf) | Displacement at max (in) | Failure Mode |
|---|---|---|---|---|---|
| 1 | 0 | 0.807 | 366.3 | −0.700 | Faceskin/core interface |
| 2 | 0 | 0.813 | 326.3 | −0.707 | Faceskin/core interface |
| 3 | 0 | 0.798 | 339.2 | −0.829 | Faceskin/core interface |
| 4 | 3 | 0.803 | 359.9 | −0.229 | Faceskin/core interface |
| 5 | 3 | 0.803 | 377.4 | −0.887 | Faceskin/core interface |
| 6 | 3 | 0.803 | 372.6 | −0.510 | Faceskin/core interface |

Figure 24:
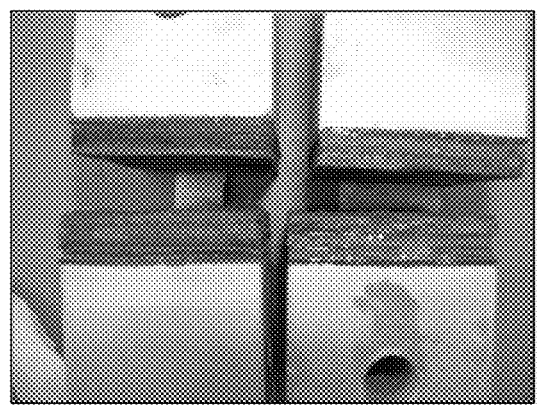
FIG. 24 illustrates inter-laminar failure for 2"×2" samples during flatwise tensile testing.

Flatwise tensile tests were performed according to ASTM C-297 with 0.75 inch cores and no inserts. The results from this test are summarized in 4. There is considerable variability between the collected data, with maximum load data ranging between 12 and 45 lbf, (3 and 11 psi). For the same target density of 0.05 g/cc, pressures of at least 25 psi were required to achieve interlaminar failure (FIG. 24).

TABLE 4

Results for Flatwise Tensile Test.

| Coupon | No. of blind inserts | Max. Load (lbf) | Flatwise Tensile Strength (psi) | Max Extension (in) | Failure Mode |
|---|---|---|---|---|---|
| 1 | 0 | 12.802 | 3.186 | 0.047 | Interlaminar |
| 2 | 0 | 45.287 | 11.265 | 0.071 | Interlaminar |
| 3 | 0 | 20.260 | 5.052 | 0.021 | Interlaminar |
| 4 | 0 | 14.075 | 3.506 | 0.040 | Interlaminar |
| 5 | 0 | 23.667 | 5.878 | 0.035 | Interlaminar |

Figure 25:
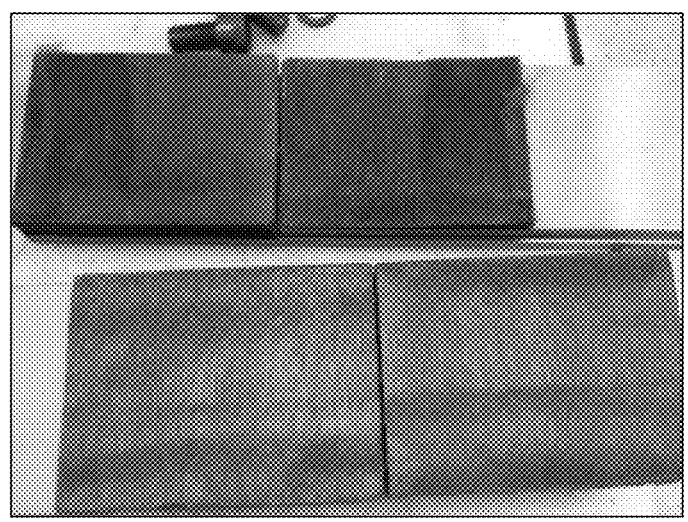
FIG. 25 illustrates inter-laminar failure for 3"×4" samples during shear testing.

A total of five samples were prepared for shear testing (according to ASTM C-273). No inserts or facesheets were included with these samples. The results are summarized in Table 5. Three out of the five samples exhibited some form of delamination prior to testing. For samples 2 and 3, the maximum loads required to cause core shear within the multi-ply stack-up of aerogel composite occurred at 568 and 464 lbf (or 47 and 38 psi, respectively). Compared to previous shear strength measurements on 0.05 g/cc target density composites with the old carbon-fiber batting, maximum load values were between 1621 and 1858 lbf (134 and 153 psi). In FIG. 25 it is evident from the post core shear failure image that built-in irregularities of the carbon-fiber batting can lead to preliminary mechanical failure.

TABLE 5

Results for Core Shear Strength Test.

| Coupon | No. of blind inserts | Max. Load (lbf) | Shear Stress (psi) | Max Extension (in) | Failure Mode |
|---|---|---|---|---|---|
| 1 | 0 | NA | NA | NA | Preliminary failure |
| 2 | 0 | 567.85 | 47.12 | 0.087 | Core shear |
| 3 | 0 | 464.02 | 38.49 | 0.053 | Core shear |
| 4 | 0 | 70.60 | 5.83 | 0.021 | Core shear (pre-failure) |

Figure 26:
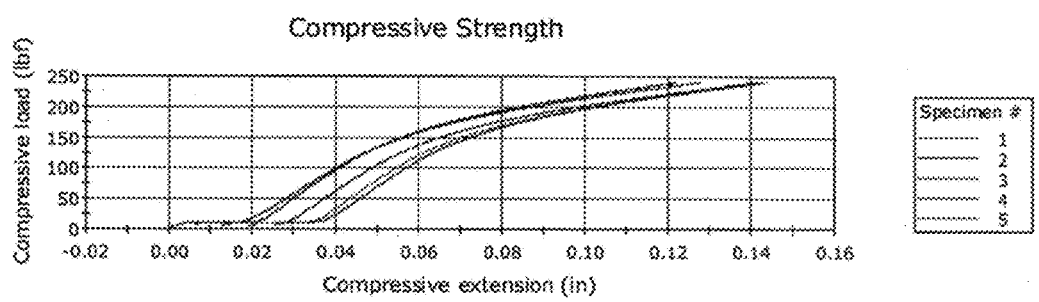
FIG. 26 illustrates stress-strain curves for 2"×2" samples during flatwise compression.

Five 2"×2" samples were measured for compression (according to ASTM D-695). No inserts, edge-seals or facesheets were installed for this set of samples. Stress-strain curves for all five samples are shown in FIG. 26. Uniaxial compression analysis of these composites indicates that at lower strains, the samples reach a plateau followed by a more substantial increase in compressive load. During the plateau, the aerogel morphology irreversibly collapses, and as long as there is a narrow distribution in cell size, the plateau region remains relatively horizontal. As the cells completely collapse with continued strain, opposing cell walls compress and solid pushes against solid. This is reflected in a rapid increase in stress and is commonly referred to as densification. The compressive strength for these samples is estimated to be around 5 psi and is determined at initial strain and prior to the plateau portion of the curve. The strength of these composites is again weaker than expected due to non-uniform carbon-fiber batting irregularities.

Example 13

CT-4 g was prepared using carbon fiber, manufactured by Technical Fibre Products Inc., as the reinforcement for the PI aerogel. The fiber has an original density of 0.0396 g/cc and is approximately ¼" in thickness. In order to obtain final core thickness of approximately ¾", the PI aerogel/fiber composite was laid up into multiple plies. CT-4 g was prepared by first preparing the poly(amic acid) solution. Pyromellitic dianhydride (PMDA, 1 mol) is dissolved in a dipolar, basic solvent such N,N-dimethylacetamide (DMAc) or N-methylpyrolidone (NMP) (4% solids). Once dissolved, 1,4-phenylene diamine (PDA, 1 mol) is then added to the solution and allowed to dissolve and polymerize for 12 hours at room temperature. After the poly(amic acid) sol has been prepared, it is ready to be catalyzed and casted in the carbon fiber reinforcement. To the poly(amic acid) sol, acetic anhydride (3.15 mol) is added and allowed to stir for 1 hour at room temperature. Pyridine (1.26 mol) is added to the solution. Before the gelation point (20 minutes), the solution is cast into the carbon-fiber reinforcement. After the PI gel is formed, the wet-gel fiber composite is aged 16 hours at 60° C. and subsequently rinsed with ethanol to remove all DMAC, unreacted monomers, and residual catalysts. The wet-gel fiber composite is then subjected to supercritical $CO_2$ drying to afford the PI aerogel carbon-fiber composite.

What is claimed is:
1. A laminate panel, comprising:
  a first layer including a fiber-reinforced aerogel composite, wherein the fiber-reinforced aerogel composite has a density between 0.01 g/cc and 0.30 g/cc;
  a thermal conductivity at ambient temperature and ambient pressure of between 15 mW/m-K and 30 mW/m-K, and a flexural strength between 105 psi and about 275 psi; and a second layer including a facesheet disposed on a major face of the first layer.

2. The panel of claim 1, wherein the panel comprises at least one vent and at least one vent filter.

3. The panel of claim 1, wherein the thermal conductivity of the first layer at ambient temperature and ambient pressure is between 15 mW/m-K and 25 mW/m-K.

4. The panel of claim 1, wherein the thermal conductivity of the first layer at ambient temperature and ambient pressure is between 15 mW/m-K and 20 mW/m-K.

5. The panel of claim 1, wherein the first layer has a thermal conductivity at ambient temperature and vacuum pressure at 10-5 Torr of between 1 mW/m-K and 5 mW/m-K.

6. The panel of claim 1, wherein the flexural strength of the first layer is between about 150 psi and about 275 psi.

7. The panel of claim 1, wherein the flexural strength of the first layer is between about 200 psi and about 275 psi.

8. The panel of claim 1, wherein the first layer has a flexural modulus of between about 5,000 psi and about 46,000 psi.

9. The panel of claim 8, wherein the flexural modulus of the first layer is between about 15,000 psi and about 46,000 psi.

10. The panel of claim 8, wherein the flexural modulus of the first layer is between about 25,000 psi and about 46,000 psi.

11. The panel of claim 1, wherein the aerogel composite comprises a polyimide aerogel or derivative thereof.

12. The panel of claim 1, further comprising a third layer including a second facesheet disposed on an opposite major face of the first layer.

13. The panel of claim 1, wherein the panel has at least one edge sealed by at least one edge seal.

14. The panel of claim 13, wherein the at least one edge seal comprises at least one vent and at least one vent filter.

15. The panel of claim 13, wherein the first facesheet, the second facesheet, and the at least one edge seal encloses an interior panel space and exclude an exterior space.

16. The panel of claim 15, wherein the at least one edge seal comprises at least one vent; and wherein the vent allows air to flow between the interior panel space and the exterior space.

17. The panel of claim 16, wherein the at least one edge seal further comprises at least one vent filter; wherein the interior panel space comprises aerogel particles; and wherein the at least one vent filter prevents the aerogel particles from passing from the interior panel space to the exterior space.

18. The panel of claim 17, wherein the aerogel composite comprises a polyimide aerogel or derivative thereof.

* * * * *

UNITED STATES PATENT AND TRADEMARK OFFICE
CERTIFICATE OF CORRECTION

PATENT NO. : 10,246,554 B2  
APPLICATION NO. : 15/419633  
DATED : April 2, 2019  
INVENTOR(S) : Shannon Olga White et al.

Page 1 of 1

It is certified that error appears in the above-identified patent and that said Letters Patent is hereby corrected as shown below:

On the Title Page

(74) Attorney, Agent, or Firm should read - Nilay J. Choksi, Poongunran Muthukumaran Signed and Sealed this
Twenty-eighth Day of May, 2019

Andrei Iancu
*Director of the United States Patent and Trademark Office*